(12) United States Patent
Minoura et al.

(10) Patent No.: US 12,437,142 B2
(45) Date of Patent: Oct. 7, 2025

(54) INFORMATION PROCESSING DEVICE, METHOD, PROGRAM, AND INFORMATION PROCESSING SYSTEM FOR ASSISTING IN EXAMINATION OF IMAGE FOR PRINTING

(71) Applicant: DAI NIPPON PRINTING CO., LTD., Tokyo (JP)

(72) Inventors: Katsuhiko Minoura, Tokyo (JP); Motoki Horita, Tokyo (JP); Takeshi Moriya, Tokyo (JP); Nagisa Hayashi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 205 days.

(21) Appl. No.: 18/266,735

(22) PCT Filed: Dec. 10, 2021

(86) PCT No.: PCT/JP2021/045510
§ 371 (c)(1),
(2) Date: Jun. 12, 2023

(87) PCT Pub. No.: WO2022/124393
PCT Pub. Date: Jun. 16, 2022

(65) Prior Publication Data
US 2024/0054277 A1    Feb. 15, 2024

(30) Foreign Application Priority Data
Dec. 11, 2020 (JP) .................................. 2020-206015

(51) Int. Cl.
*G06F 40/106* (2020.01)
*G06F 40/232* (2020.01)
*G06V 30/19* (2022.01)

(52) U.S. Cl.
CPC .......... *G06F 40/106* (2020.01); *G06F 40/232* (2020.01); *G06V 30/1908* (2022.01)

(58) Field of Classification Search
CPC .. G06F 40/106; G06F 40/232; G06V 30/1908
See application file for complete search history.

(56) References Cited

U.S. PATENT DOCUMENTS 9,876,916 B1    1/2018  Casio
10,607,041 B2 * 3/2020  Sareen .................... G06F 18/23
(Continued)

FOREIGN PATENT DOCUMENTS

JP    2013-029982 A    2/2013
JP    2017094745 A  *  6/2017
(Continued)

OTHER PUBLICATIONS

Suzuki Hidenao, JP 2017094745 A, English translation, 6 pages, published Jun. 1, 2017 (Year: 2017).*

(Continued)

*Primary Examiner* — Barbara M Level
(74) *Attorney, Agent, or Firm* — Oliff PLC

(57) ABSTRACT

An information processing device for assisting in examination of an image for printing. The information processing device recognizes a character string and a non-character object included in the image for printing that has been input, determines a plurality of element regions each including the character string recognized, determines whether, in each of the element regions, the recognized character string matches a character string included in document data, determines whether, in each of the element regions, the recognized character string satisfies a predetermined condition, and displays a confirmation screen including the image for printing clearly indicating a region determined not to match the character string included in the document data or a (Continued)

region determined not to satisfy the predetermined condition defined by the regulation data.

8 Claims, 20 Drawing Sheets

(56) References Cited

U.S. PATENT DOCUMENTS

| | | | | |
|---|---|---|---|---|
| 11,087,187 B2* | 8/2021 | Meena | ............... | G06V 30/127 |
| 11,188,837 B2* | 11/2021 | Bissell | ............... | G06N 5/025 |
| 11,210,506 B2* | 12/2021 | Kawabe | ............... | G06V 10/761 |
| 11,842,534 B2* | 12/2023 | Soga | ............... | G06F 18/28 |
| 2005/0289182 A1* | 12/2005 | Pandian | ............... | G06Q 10/10 |
| 2008/0212901 A1* | 9/2008 | Castiglia | ............... | G06V 10/987 |
| | | | | 382/311 |
| 2021/0067641 A1* | 3/2021 | Sasagawa | ............... | H04N 1/00411 |

FOREIGN PATENT DOCUMENTS

| | | |
|---|---|---|
| JP | 2017-156889 A | 9/2017 |
| JP | 2018-067159 A | 4/2018 |
| WO | 2019/171070 A1 | 9/2019 |

OTHER PUBLICATIONS

May 24, 2024 extended Search Report issued in European Patent Application No. 21903489.9.
Feb. 8, 2022 Written Opinion of the International Searching Authority issued in International Patent Application No. PCT/JP2021/045510.
Mar. 14, 2024 Office Action issued in Japanese Patent Application No. 2022-120794.

* cited by examiner

FIG.7

| Sequence No. | Category | Frame display | Delimiter by item | Item symbol | Delimiter between item and value | Item | Value | Character color | Minimum character size |
|---|---|---|---|---|---|---|---|---|---|
| 1 | Display of ingredients | Yes | None | ● | : | Product name | xx drink | ... | ... |
| 2 | Display of ingredients | Yes | None | ● | : | Ingredients | xx, yy, ... | ... | ... |
| 3 | Display of ingredients | Yes | None | ● | : | Content | xx ml | ... | ... |
| 4 | Display of ingredients | Yes | None | ● | : | Expiration date | xx・・・ | ... | ... |
| 5 | Display of ingredients | Yes | None | ● | : | Storage condition | xx・・・ | ... | ... |
| 6 | Display of ingredients | Yes | None | ● | : | Seller | xx・・・ | ... | ... |
| 7 | Display of nutrition facts | Yes | , | None | : | Energy | xx kcal | ... | ... |
| 8 | Display of nutrition facts | Yes | Linefeed | None | : | Protein | xx g | ... | ... |
| 9 | Display of nutrition facts | Yes | , | None | : | Fat | xx g | ... | ... |
| 10 | Display of nutrition facts | Yes | Linefeed | None | : | Carbohydrate | xx g | ... | ... |
| 11 | Display of nutrition facts | Yes | None | None | : | Salt equivalent | xx g | ... | ... |

FIG.8a

| |
|---|
| ● Product name: xx drink    ● Ingredients: xx, xx, ···    ● Content: xx ml<br>● Expiration date: xx···    ● Storage condition: xx···<br>● Seller: xx··· |

FIG.8b

| Display of nutrition facts (per 100 ml) |
|---|
| Energy: xx kcal, Protein: xx g,<br>Fat: xx g, Carbohydrate: xx g,<br>Salt equivalent: xx g |

FIG.9

| Subject | Rule ID | Rule name | Applicable function | Preceding rule and result | Knowledge file |
|---|---|---|---|---|---|
| Material name | | | | | |
| Common | 1001 | Document A | Attribute check for general text Prohibited word | | "XX", "Prohibited words that appear to be inaccurate indications and expressions have been used. Please correct them." "YY", "Prohibited words that are considered to be inaccurate indications and expressions are used. Please correct them." |
| Common | 1002 | All subjects | Attribute check for general text Typo/Omission/Wrong word | | "Month (in Hiragana and Kanji)", "Please use MY word correctly. [Month (in Hiragana and Kanji)] → [Month (in Katakana and Kanji)]" "Month (only in Kanji)", "Please use MY word correctly. [Month (only in Kanji)] → [Month (in Hiragana and Kanji)]" |
| Common | 1003 | Document A | Attribute check for general text Typo/Omission/Wrong word | | "Do (in Hiragana and Kanji)", "Please use MY word correctly. [Do (in Hiragana and Kanji)] → [Do (only in Hiragana)]" |
| Promotional item | 1004 | Document A | Check for presence of specific text Presence or absence of text | | "ZZ" |
| Promotional item | 1005 | Document A | Check for presence of specific text Presence or absence of text | 1004: Determination of OK | "ZZ is XX", "Please write copy wording. [ZZ is XX]" |

INFORMATION PROCESSING DEVICE, METHOD, PROGRAM, AND INFORMATION PROCESSING SYSTEM FOR ASSISTING IN EXAMINATION OF IMAGE FOR PRINTING

TECHNICAL FIELD

The present invention relates to an information processing device, a method, a program, and an information processing system for assisting in examination of an image for printing.

BACKGROUND ART

Examination work such as proofreading or reviewing has been performed for various images for printing to be used in creating, for example, advertisements, product labels, or packages before the images for printing are printed. The examination work includes a document comparative examination to compare an image for printing with a document from which the image for printing is generated or a regulation examination to check prohibited words and essential words specific to a target industry or organization. The examination work uses characters extracted by using an application capable of character recognition, but confirmation is often performed by human eyes.

CITATION LIST

Patent Document

Patent Document 1: JP 2018-67159 A

SUMMARY OF INVENTION

Technical Problem

Work automation has recently been advanced in various fields. For example, Patent Document 1 discloses a technique related to automation of grading papers for checking spelling errors in English and allowing for reviewing a sentence acquired from a document image and easily creating an image illustrating the result of the review and a correct answer in the document.

In such a situation, the examination work of the image for printing involves multiple people in multiple examinations, such as the document comparative examination and the regulation examination, and thus achieving labor savings has been difficult. The present invention has been made to solve such a problem, and a main object is to provide an information processing device and the like capable of labor savings in examination work of an image for printing.

Solution to Problem

An information processing device according to an embodiment of the present invention is an information processing device for assisting in examination of an image for printing including: a storage unit configured to store document data including a character string from which an image for printing is generated and regulation data defining a predetermined condition for checking a character string included in the image for printing; an image recognition unit configured to recognize the character string and a non-character object included in the image for printing that has been input and determine a plurality of element regions each including the character string recognized; a document determination unit configured to determine whether, in each of the element regions, an individual character of the character string recognized by the image recognition unit matches an individual character of the character string included in the document data; a regulation determination unit configured to determine whether, in each of the element regions, the character string recognized by the image recognition unit satisfies the predetermined condition defined by the regulation data; and a display control unit configured to control displaying, on a display device, a confirmation screen including the image for printing clearly indicating a region of the individual character determined, by the document determination unit, not to match the character string included in the document data, or a region of a character string determined, by the regulation determination unit, not to satisfy the predetermined condition defined by the regulation data.

In an embodiment of the present invention, the display control unit controls displaying, in the confirmation screen, a determination result display region indicating a determination result in the document determination unit or the regulation determination unit for each of the element regions, the determination result display region includes confirmation objects associated with respective element regions including the individual character determined, by the document determination unit, not to match the character string included in the document data or respective element regions including the character string determined, by the regulation determination unit, not to satisfy the predetermined condition defined by the regulation data, and each of the confirmation objects includes a check input object indicating whether the confirmation object has been confirmed.

In an embodiment of the present invention, the display control unit controls, in response to user input, switching between the images for printing clearly indicating the region of the individual character determined, by the document determination unit, not to match the character string included in the document data and the image for printing clearly indicating the region of the character string determined, by the regulation determination unit, not to satisfy the predetermined condition defined by the regulation data and displaying one of the images for printing in the confirmation screen.

In an embodiment of the present invention, the document data includes a plurality of pieces of element document data each including a character string corresponding to content to be output, the document determination unit determines whether, in each of the element regions, the character string recognized by the image recognition unit matches the character string included in any one piece of element document data of the plurality of pieces of element document data, and the display control unit controls displaying, in the confirmation screen, the image for printing in which a region of a character determined, by the document determination unit, to be matched and a region of a character determined, by the document determination unit, not to be matched are filled with different colors or patterns.

In an embodiment of the present invention, the predetermined condition defined by the regulation data includes at least one of the character string recognized by the image recognition unit not including a predetermined prohibited word, the character string recognized by the image recognition unit not including a predetermined typographical error, the character string recognized by the image recognition unit including a predetermined essential word, an image recognized by the image recognition unit including a specific image, or a specific character or the specific image recognized by the image recognition unit being displayed in a predetermined format.

In an embodiment of the present invention, the information processing device is a server, and the display control unit controls displaying the confirmation screen on a display device of a client terminal.

A method according to an embodiment of the present invention is a method for assisting in examination of an image for printing executed by a computer including: an image recognition step of recognizing a character string and a non-character object included in an image for printing that has been input and determining a plurality of element regions each including the character string recognized; a document determination step of determining whether, in each of the element regions, an individual character of the character string recognized in the image recognition step matches an individual character of a character string included in document data including the character string from which the image for printing is generated; a regulation determination step of determining whether, in each of the element regions, the character string recognized in the image recognition step satisfies a predetermined condition defined by regulation data defining the predetermined condition for checking a character string included in the image for printing; and a display control step of controlling displaying, on a display device, a confirmation screen including the image for printing clearly indicating a region of the individual character determined, in the document determination step, not to match the character string included in the document data or a region of the character string determined, in the regulation determination step, not to satisfy the predetermined condition defined by the regulation data.

A program according to an embodiment of the present invention causes a computer to execute each step of the method described above.

An information processing system according to an embodiment of the present invention is an information processing system including an information processing device and a user terminal for assisting in examination of an image for printing. The information processing system includes: a storage unit configured to store document data including a character string from which an image for printing is generated and regulation data defining a predetermined condition for checking a character string included in the image for printing; an image recognition unit configured to recognize the character string and a non-character object included in the image for printing that has been input and determine a plurality of element regions each including the character string recognized; a document determination unit configured to determine whether, in each of the element regions, an individual character of the character string recognized by the image recognition unit matches an individual character of the character string included in the document data; a regulation determination unit configured to determine whether, in each of the element regions, the character string recognized by the image recognition unit satisfies the predetermined condition defined by the regulation data; and a display control unit configured to control displaying, on a display device of a user terminal, a confirmation screen including the image for printing clearly indicating a region of the individual character determined, by the document determination unit, not to match the character string included in the document data or a region of the character string determined, by the regulation determination unit, not to satisfy the predetermined condition defined by the regulation data.

Advantageous Effects of Invention

The present invention enables labor savings in examination work of an image for printing.

BRIEF DESCRIPTION OF DRAWINGS

FIG. 7 is a diagram illustrating an example of a part of document data.

FIG. 8a is a diagram illustrating an example of an element region corresponding to element document data.

FIG. 8b is a diagram illustrating an example of the element region corresponding to element document data.

FIG. 9 is a diagram illustrating an example of a part of regulation data.

FIG. 10 is a diagram illustrating an example of an image for printing.

FIG. 19 is a diagram illustrating an example of the confirmation screen displayed on the display device by the display control unit.

DESCRIPTION OF EMBODIMENTS

Figure 1:
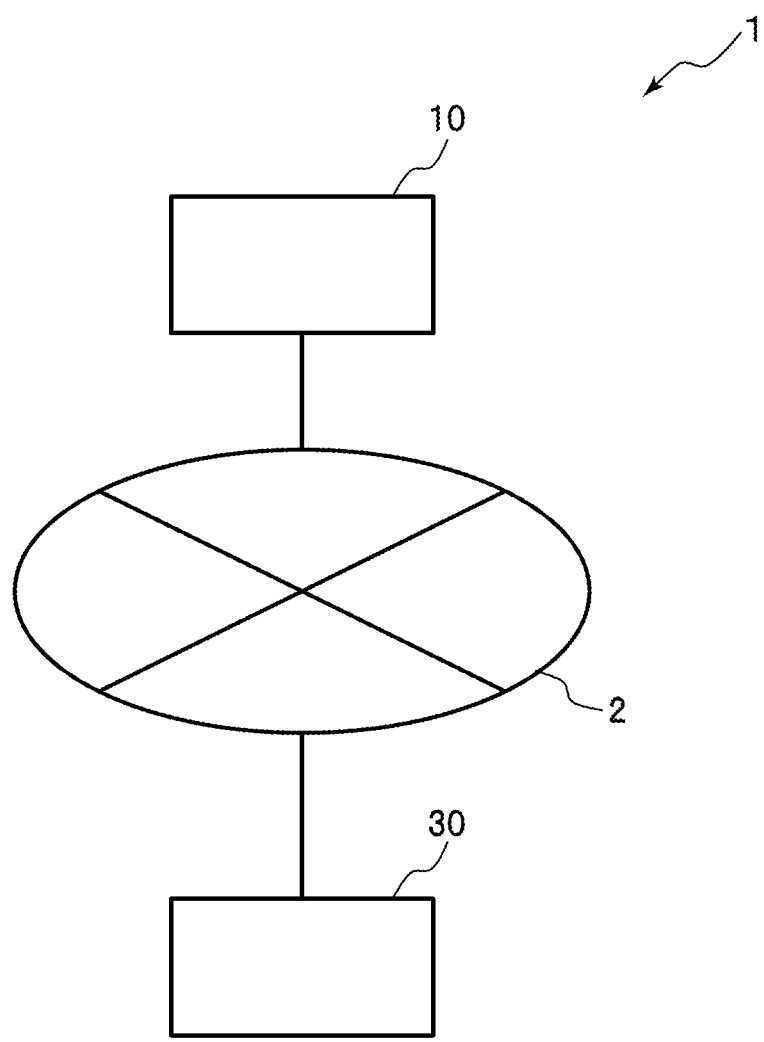
FIG. 1 is an overall configuration diagram of an information processing system according to an embodiment of the present invention.

Hereinafter, an embodiment of the present invention will be described with reference to the drawings. An embodiment of the present invention is implemented by an information processing device 10 or an information processing system 1 including the information processing device 10. In the drawings, the same reference numerals denote the same or corresponding parts unless otherwise specified, and an unnecessarily detailed description may be omitted. A data structure in a database and a database structure described in the embodiment of the present invention are merely examples, and the present invention is not limited thereto.

FIG. 1 is an overall configuration diagram of the information processing system 1 according to an embodiment of the present invention. As illustrated in FIG. 1, the information processing system 1 includes the information processing device 10 and one or more user terminals 30, which are connected to a network 2 such as the Internet and can communicate with each other.

Figure 2:
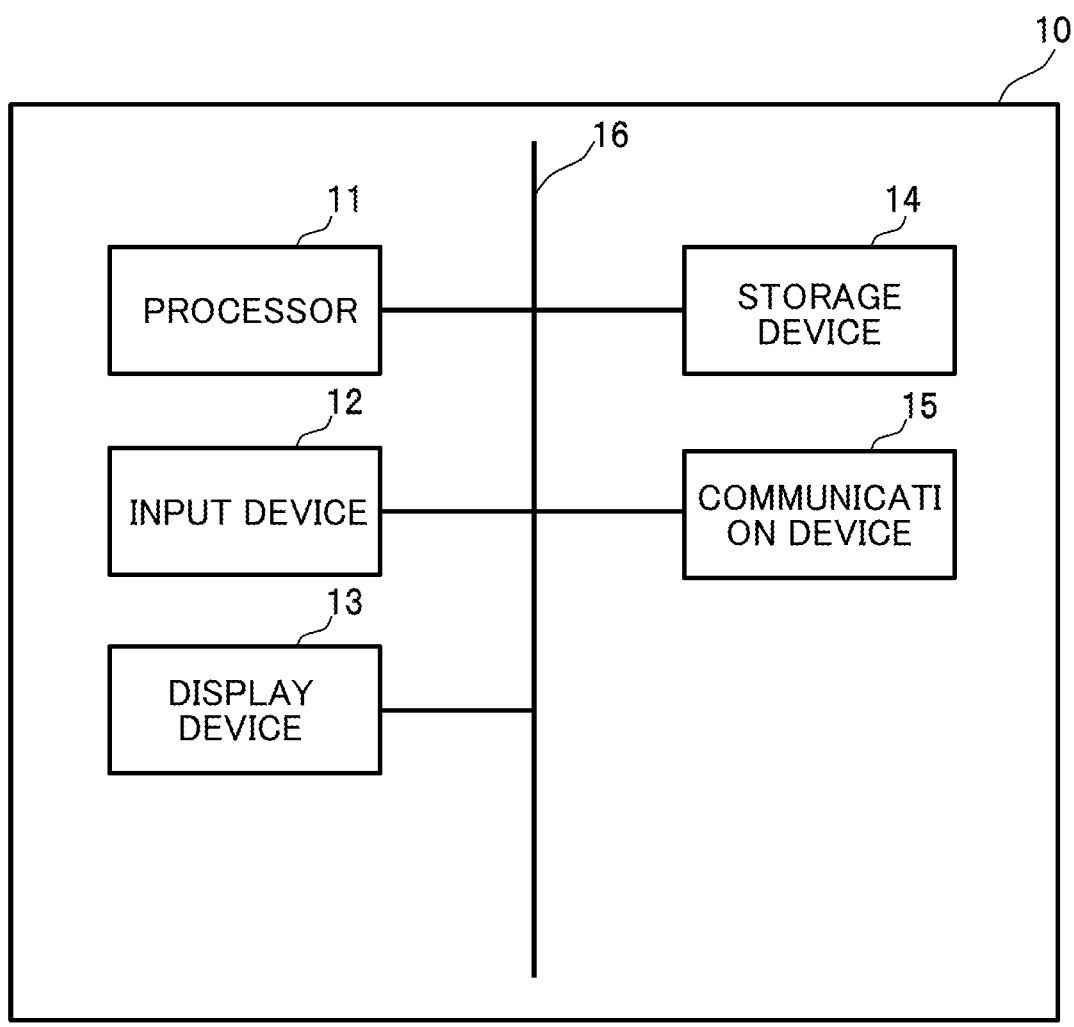
FIG. 2 is a block diagram illustrating a hardware configuration of an information processing device according to an embodiment of the present invention.

FIG. 2 is a block diagram illustrating a hardware configuration of the information processing device 10 according to an embodiment of the present invention. The information processing device 10 includes a processor 11, an input device 12, a display device 13, a storage device 14, and a communication device 15. These constituent devices are connected to each other by a bus 16. Note that an interface is interposed between the bus 16 and each constituent device as necessary.

The processor 11 controls the entire operation of the information processing device 10. For example, the processor 11 is a CPU. The processor 11 executes various processing by reading and executing programs and data stored in the storage device 14. The processor 11 may include a plurality of processors.

The input device 12 is a user interface that receives input from a user to the information processing device 10, and is, for example, a touch panel, a touch pad, a mouse, a keyboard, or a sensor. The display device 13 is a display that displays an application screen or the like to the user of the information processing device 10 under the control of the processor 11.

The storage device 14 includes a main storage device and an auxiliary storage device. The main storage device is, for example, a semiconductor memory such as a RAM. The RAM is a volatile storage medium capable of reading and writing information at a high speed and is used as a storage area and a work area when the processor 11 processes information. The main storage device may include a ROM, which is a read-only nonvolatile storage medium. The auxiliary storage device stores various programs and data used by the processor 11 when executing those programs. The auxiliary storage device may be any nonvolatile storage or nonvolatile memory as long as it can store information and may be removable.

The communication device 15 exchanges data with another computer such as a user terminal or a server via a network, and is, for example, a wireless LAN module. The communication device 15 can be another wireless communication device or module such as a Bluetooth (trade name) module or can be a wired communication device or module such as an Ethernet (trade name) module or a USB interface.

Figure 3:
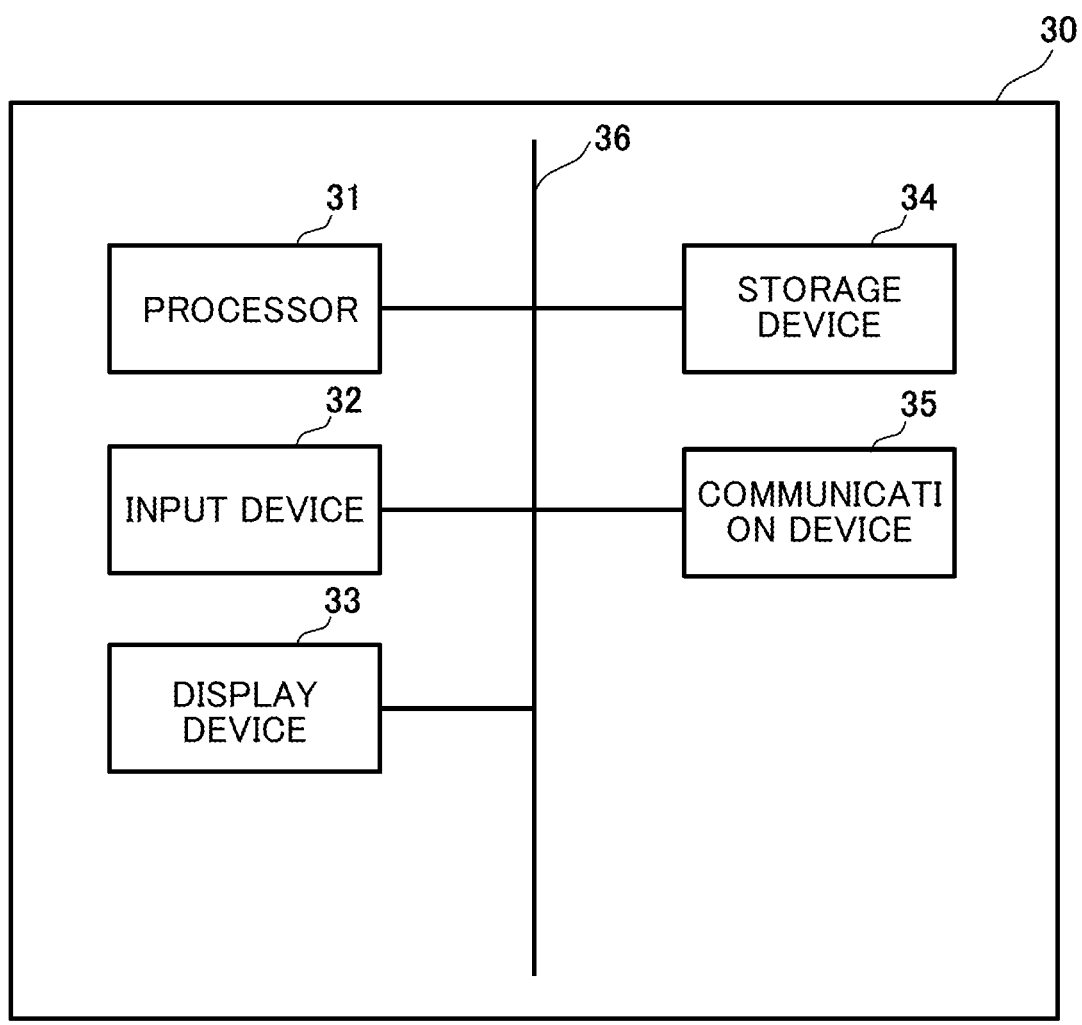
FIG. 3 is a block diagram illustrating a hardware configuration of a user terminal according to an embodiment of the present invention.

FIG. 3 is a block diagram illustrating a hardware configuration of the user terminal 30 according to an embodiment of the present invention. The user terminal 30 includes a processor 31, an input device 32, a display device 33, a storage device 34, and a communication device 35. These constituent devices are connected to each other by a bus 36. Note that an interface is interposed between the bus 36 and each constituent device as necessary. The components of the processor 31, the input device 32, the display device 33, the storage device 34, and the communication device 35 correspond to and have configurations similar to, the processor 11, the input device 12, the display device 13, the storage device 14, and the communication device 15 described above, respectively, and thus description thereof will be omitted.

The information processing device 10 is a device for assisting in examination of an image for printing and is a server providing a service to the user terminal 30. The information processing device 10 may include a configuration similar to that of a general server. In an example, the information processing device 10 is a known server computer. The information processing device 10 may include a plurality of devices. The user terminal 30 is a computer used by a user who uses a service for assisting in examination of an image for printing, and may be, for example, a personal computer, a tablet terminal, a smartphone, a mobile phone, or the like.

In the present embodiment, the information processing device 10 receives input (transmission) of a target image for printing via the user terminal 30.

Figure 4:
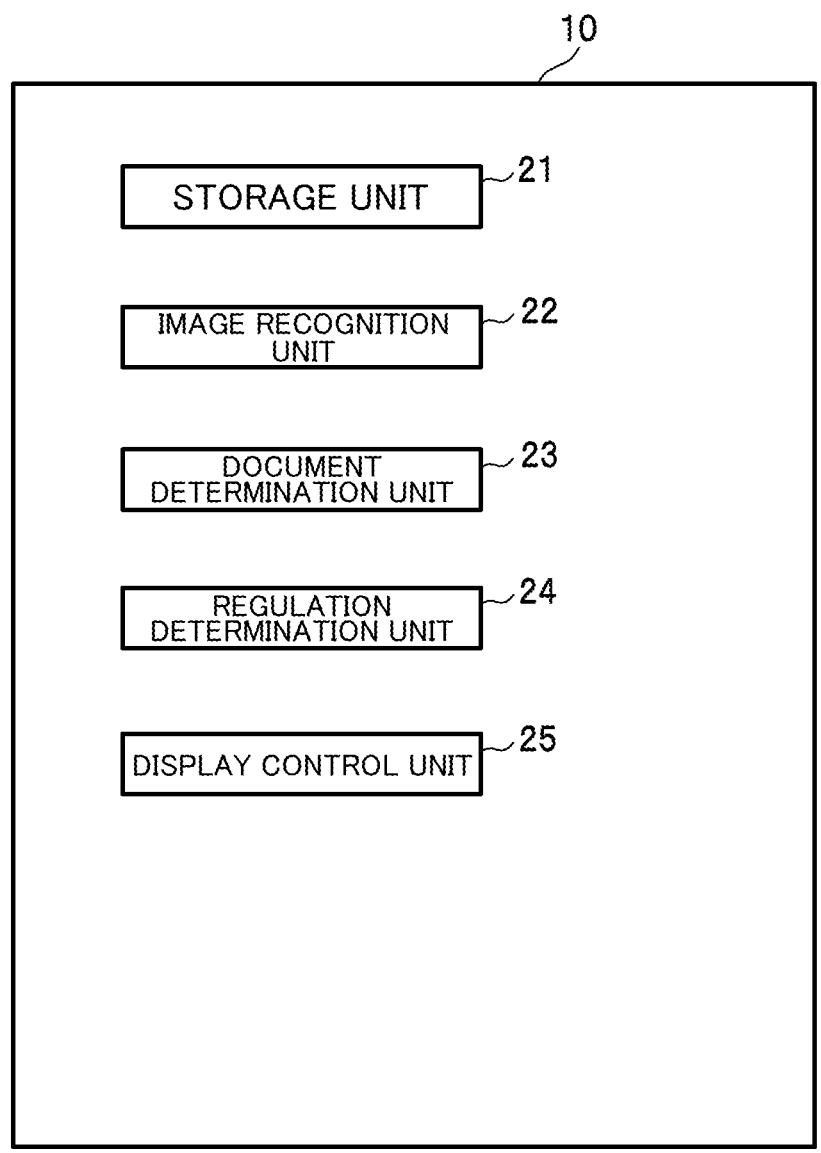
FIG. 4 is a functional block diagram of the information processing device according to an embodiment of the present invention.

FIG. 4 is a functional block diagram of the information processing device 10 according to an embodiment of the present invention. The information processing device 10 includes a storage unit 21, an image recognition unit 22, a document determination unit 23, a regulation determination unit 24, and a display control unit 25. In the present embodiment, these functions are implemented by the processor 11 executing the programs or by the storage device 14. For example, the programs to be executed is programs stored in the storage device 14 or received via the communication device 15. The functions implemented by program reading for one part (function block) may be partly or wholly owned by another part. However, these functions may be implemented also by hardware by configuring an electronic circuit or the like for implementing some or all of the functions.

The storage unit 21 has a function of storing programs, data, and the like. The function of the storage unit 21 is implemented by the storage device 14. In the present embodiment, the storage unit 21 has a database function. The database function is implemented by storing data (for example, tables) and programs for various databases by the storage device 14 and executing the programs.

The storage unit 21 stores an image for printing received via the user terminal 30. The storage unit 21 stores document data including a character string (character) from which an image for printing is generated, and regulation data defining a predetermined condition for checking a character string (character) included in the image for printing. In the present embodiment, the character string is a concept including even one character. Here, the image for printing is an image for printing used when creating an advertisement, a product label, a package, or the like, and is, for example, a package image. The image for printing is an image for printing on a print target (for example, a paper medium) such as an advertisement, a product label, or a package. However, the image for printing means an image output based on certain data and may be an image for printing onto an electronic medium. For example, the image for printing may be a Web image or an electronic contract required to be examined.

Figure 5:
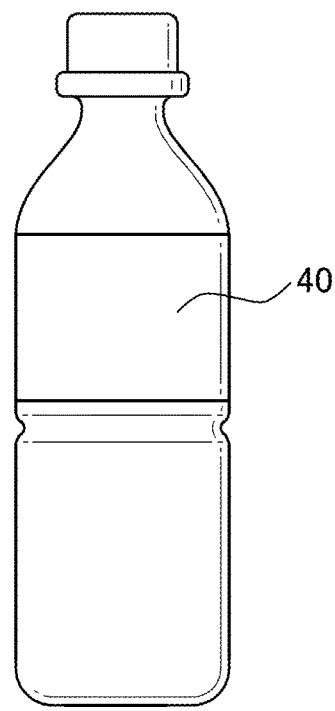
FIG. 5 is a diagram illustrating an example of a print target on which an image for printing is printed.
Figure 6:
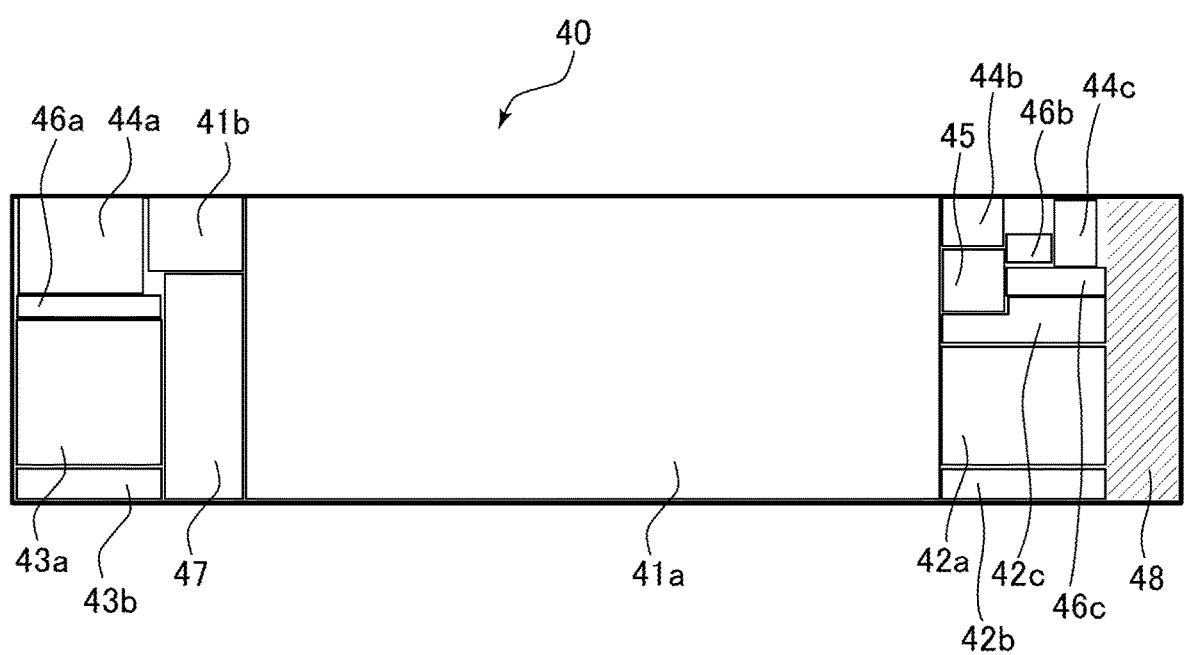
FIG. 6 is a diagram illustrating an example of the image for printing illustrated in FIG. 5.

FIG. 5 is a diagram illustrating an example of a print target on which an image for printing 40 is printed. The image for printing 40 is an image printed on an advertisement label wrapped around a PET bottle. FIG. 6 is a diagram illustrating an example of the image for printing 40 illustrated in FIG. 5. The image for printing 40 includes a region 41 in which a design, illustration, or words related to a product is printed, a region 42 in which product information or company information is printed, a region 43 in which a display of nutrition facts is printed, a region 44 in which a resource-related logo is printed, a region 45 in which a product-related logo is printed, a region 46 in which words or design common to the industry to which the product belongs is printed, a region 47 in which a product identification code is printed, and a region 48 for adhering a print target. As described above, the image for printing 40 includes a plurality of element regions (41*a*, 41*b*, 42*a*, 42*b*, 42*c*, 43*a*, 43*b*, 44*a*, 44*b*, 44*c*, 45, 46*a*, 46*b*, 46*c*, 47, and 48). The element region is a unit region constituting an image for printing, and is, for example, a region of a minimum unit for providing certain information. For example, each region of the plurality of element regions is any one of a region including only a character string and a color, a region including only a character string and a predetermined image or illustration, or a region including only a predetermined image or illustration.

The image for printing is generated based on document data including data of a character string. For example, the information processing device 10 receives document data created by a user from the user terminal 30 and stores the document data in the storage unit 21. FIG. 7 is a diagram illustrating an example of a part of the document data. Each of sequence numbers 1 to 6 and sequence numbers 7 to 11 illustrated in FIG. 7 denotes element document data, and FIG. 7 illustrates two pieces of element document data. The element document data is data of a character string included in one element region. FIG. 8 is a diagram illustrating an example of the element region corresponding to the element document data. The element region of the image for printing illustrated in FIG. 8*a* is a region in which product information and company information are printed and corresponds to the element document data denoted by the sequence numbers 1 to 6 illustrated in FIG. 7. The element region of the image for printing illustrated in FIG. 8*b* is a region where display of nutrition facts is printed and corresponds to the element document data denoted by the sequence numbers 7 to 11 illustrated in FIG. 7. Note that, in the present embodiment, the information processing device 10 stores and uses document data created by a user. In a case where the data created by the user has an arbitrary format, the information processing device 10 stores document data converted in advance into a predetermined format as illustrated in FIG. 7 in the storage unit 21.

The image recognition unit 22 recognizes a character string and a non-character object included in an image for printing that has been input and determines a plurality of element regions in the image for printing. Each of the plurality of element regions includes a recognized character string. The image recognition unit 22 can have a known character recognition function and a known image recognition function. The non-character object is a photographic image, a picture, or a graphic. Note that the image recognition unit 22 can determine a region including a predefined predetermined non-character object as one element region even if the region does not include a character string. The definition of the element region can be changed by setting of the image recognition unit 22.

In an example, the image recognition unit 22 recognizes characters and a predetermined non-character object, recognizes a plurality of element regions from the arrangement of the characters and the non-character object, and determines each of the element regions. In an example, the image recognition unit 22 recognizes each of the element regions using coordinates in the image for printing, and identifiably stores each of the element regions in association with a region ID in the storage unit 21. In an example, the image recognition unit 22 stores the recognized character in association with the element region including the character in the storage unit 21. In this case, the image recognition unit 22 may store the recognized non-character object in association with the element region including the non-character object in the storage unit 21. In an example, the image recognition unit 22, when recognizing characters, stores position information of each of the characters in the storage unit 21. In this case, the image recognition unit 22, when recognizing a non-character object, the image recognition unit 22 can store position information of the non-character object in the same manner as the character. The position information is represented by, for example, coordinates in the image for printing. The image recognition unit 22, in a case of storing the position information of the element region or the target such as a character, may store the position information using a predetermined position (for example, the center or the upper left end) of the recognized target and a size of the target, or may store the position information indicating a range occupied by the recognized target.

In an example, the image recognition unit 22 can be implemented by using image recognition based on a pattern of an image feature amount or image recognition based on layout analysis such as OCR.

The document determination unit 23 determines whether, in each of the element regions, an individual character of the character string recognized by the image recognition unit 22 matches an individual character of the character string included in the document data. In the present embodiment, the document determination unit 23 determines whether, in each of the element regions, the character string recognized by the image recognition unit 22 matches the character string included in any one piece of element document data of the plurality of pieces of element document data. In the present embodiment, the document determination unit 23 performs determination processing for each character in each of the element regions.

The regulation determination unit 24 determines whether, in each of the element regions, the character string recognized by the image recognition unit 22 satisfies a predetermined condition defined by the regulation data. The regulation determination unit 24 can perform determination processing for each target character string (character or word) of regulation data in each of the element regions. For example, the information processing device 10 stores, in the storage unit 21, the regulation data created in advance in accordance with a field or industry in which an image for printing to be created is used. In addition to or instead of this, the information processing device 10 can receive the regulation data created by the user from the user terminal 30 and store the regulation data in the storage unit 21. In a case where the information processing device 10 uses the regulation data created by the user and having an arbitrary format, the information processing device 10 stores regulation data converted in advance into a predetermined format as illustrated in FIG. 9 in the storage unit 21.

FIG. 9 is a diagram illustrating an example of a part of the regulation data. Each of rule IDs indicates one of the predetermined conditions. For example, the predetermined condition denoted by the rule ID of 1001 defines that in a case where "XX" or "YY" is included in the character string recognized from the image for printing, the character string needs to be corrected. In an example, the image recognition unit 22 performs morphological analysis/syntax analysis, which are natural language processing, on the character string recognized from the image for printing and determines a noun, a verb, an adjective, or the like. As a result, when, for example, the predetermined condition is "correct [have (only in Hiragana)] to [have (in Hiragana and Kanji)]", the regulation determination unit 24 recognizes all character strings of "have" such as "having product," "have product," and "have had product," and performs the determination processing. In an example, in a case where a superlative expression (such as "best," "number-one," or "supreme") is registered as the prohibited word, the regulation determination unit 24 determines whether there is a violation of an exaggerated expression in the truth-in-advertising laws, such as whether the superlative expression modifies a product name or whether the superlative expression modifies another expression, and performs the determination processing. For example, the regulation determination unit 24 determines that an expression "best beer" corresponds to an exaggerated expression and does not satisfy the predetermined condition but determines that an expression "best place for beer lovers" does not correspond to an exaggerated expression and satisfies the predetermined condition.

In an example, the predetermined condition defined by the regulation data includes at least one of a character string recognized by the image recognition unit 22 not including a predetermined prohibited word, the recognized character string not including a predetermined typographical error, or the recognized character string including an essential word. The predetermined prohibited word and the predetermined essential word may be predefined based on a field or industry in which the image for printing to be created is used or may be predefined for each image for printing to be created. The predetermined typographical error may be checked by being compared with a predetermined typographical error defined in advance or with a known typographical error check program. For example, in a case where a known typographical error check program is used, the program may be associated with one predetermined condition such that the regulation determination unit 24 is configured to activate the program to check the typographical error. Learned data created by a known program may be used for the known typographical error check program.

The regulation determination unit 24 may determine whether, in each of the element regions, the non-character object recognized by the image recognition unit 22 satisfies a predetermined condition defined by the regulation data. For example, the predetermined condition defined by the regulation data may include the image recognized by the image recognition unit 22 including a specific image, instead of or in addition to the above example. For example, the predetermined condition defined by the regulation data may include a specific character recognized by the image recognition unit 22 being displayed in a predetermined format and/or a specific image recognized by the image recognition unit 22 being displayed in a predetermined format, instead of or in addition to the above example. In this case, the image recognition unit 22 can recognize a specific character or a specific image as well as its position and shape.

The display control unit 25 generates data for displaying the confirmation screen 60 including the image for printing on which image processing or modification is performed according to determination results determined by the document determination unit 23 and the regulation determination unit 24, and controls displaying the confirmation screen 60 on the display device 33 or the display device 13. Here, the display control unit 25 controlling displaying the confirmation screen 60 on the display device 33 includes the display control unit 25 displaying the confirmation screen 60 on the display device 33, and means, for example, that the display control unit 25 (the information processing device 10) transmits data for displaying the confirmation screen 60 to the user terminal 30, and the display device 33 displays the screen. The display control unit 25 controlling displaying the confirmation screen 60 on the display device 13 means that the display control unit 25 (the information processing device 10) displays the confirmation screen 60 on the display device 13. The display control unit 25 may control displaying the confirmation screen 60 on the display device 33 and the display device 13. In the present specification, for convenience of description, the display control unit 25 displaying a screen or an image can mean that the display control unit 25 controls displaying the screen or the image on the display device 33 or the display device 13.

In an example, the storage device 14 stores a web application, and the information processing device 10 provides a web page to the user terminal 30 that accesses the web application. The user, by operating the user terminal 30 via the web page, can transmit an image for printing, document data including a character string from which an image for printing is generated, or the like to the information processing device 10, and the information processing device 10 can receive the data. The display control unit 25 displays the confirmation screen 60 on the display device 33 via the web page. In this case, the display control unit 25 may include a function of a general server necessary for displaying the web page on the screen of the user terminal 30.

The confirmation screen 60 is a screen that includes an image for printing clearly indicating a region of a character determined, by the document determination unit 23, not to match a character string included in the document data (the region in which the character is displayed) or a region of a character string determined, by the regulation determination unit 24, not to satisfy a predetermined condition defined by the regulation data (the region in which the character or the word is displayed). In an example, the display control unit 25 displays, in the confirmation screen 60, in accordance with a user operation, any one of an image for printing clearly indicating the region of the character determined, by the document determination unit 23, not to match the character string included in the document data, or the region of the character string determined, by the regulation determination unit 24, not to satisfy the predetermined condition defined by the regulation data. The confirmation screen 60 may be a screen that includes an image for printing clearly indicating the element region including the character determined, by the document determination unit 23, not to match the character string included in the document data, or the element region including the character string determined, by the regulation determination unit 24, not to satisfy the predetermined condition defined by the regulation data.

In an example, the display control unit 25, when displaying the confirmation screen 60, displays an image for printing on which a rendering object for clearly indicating the region is superimposed. In this case, the display control unit 25 superimposes the rendering object by using, for example, the position information of the character or non-character object stored in the storage unit 21 and stored by the image recognition unit 22. In an example, for the region of the character determined, by the document determination unit 23, not to match the character string included in the document data, the display control unit 25 renders a rendering object for each character so that the determination result can be confirmed on a character-by-character basis. In this case, the rendering object may be a frame-shaped object that surrounds each character, or may be an object for containing each character to be filled in. In an example, the region of the character string determined, by the regulation determination unit 24, not to satisfy the predetermined condition defined by the regulation data, the display control unit 25 renders a rendering object at a position where the region can be confirmed. In this case, the rendering object may be an object including an identifiable number or character. Note that the image processing or modification for superimposing the rendering object on the image for printing by the display control unit 25 is an example for clearly indicating the region and may be any image processing or modification that can have the similar effect without limitation.

FIG. 10 is a diagram illustrating an example of an image for printing 50. Hereinafter, operations of the information processing device 10 when one user examines the image for printing 50 illustrated in FIG. 10 will be described with reference to FIGS. 11 to 20.

The information processing device 10 receives an input of the image for printing 50 via the user terminal 30. The image recognition unit 22 recognizes a character string and a non-character object included in the image for printing 50 that has been input and determines a plurality of element regions, each of the element regions including the recognized character string.

Figure 11:
FIG. 11 is a diagram illustrating examples of an element region including a character string recognized by an image recognition unit in the image for printing in FIG. 10 and an element region not including the character string.

FIG. 11 is a diagram illustrating examples of an element region 51 including a character string and an element region 52 not including a character string, recognized by the image recognition unit 22, in the image for printing 50 in FIG. 10. The element region 51 is a region including only a character string or a region including a character string and a non-character object. The element region 52 is a region including only a non-character object. The image recognition unit 22 recognizes a character string and a non-character object and determines the element region 51 including the character string. The image recognition unit 22 may determine the element region 52 not including a character string.

The document determination unit 23 determines whether the character string, in each of the element regions 51, recognized by the image recognition unit 22 matches the character string included in one corresponding piece of element document data of the plurality of pieces of element document data. In an example, the document determination unit 23 determines whether the character string, associated with one region ID, recognized by the image recognition unit 22 matches the character string included in one corresponding element document data of the plurality of pieces of element document data. The document determination unit 23 performs determination processing for each character. The character on which the determination processing is performed is associated with the element region 51 (region ID).

The regulation determination unit 24 determines whether the character string, in each of the element regions 51, recognized by the image recognition unit 22 satisfies a predetermined condition defined by the regulation data. In this example, the character string determined by the regulation determination unit 24 is associated with the element region 51.

Figure 12:
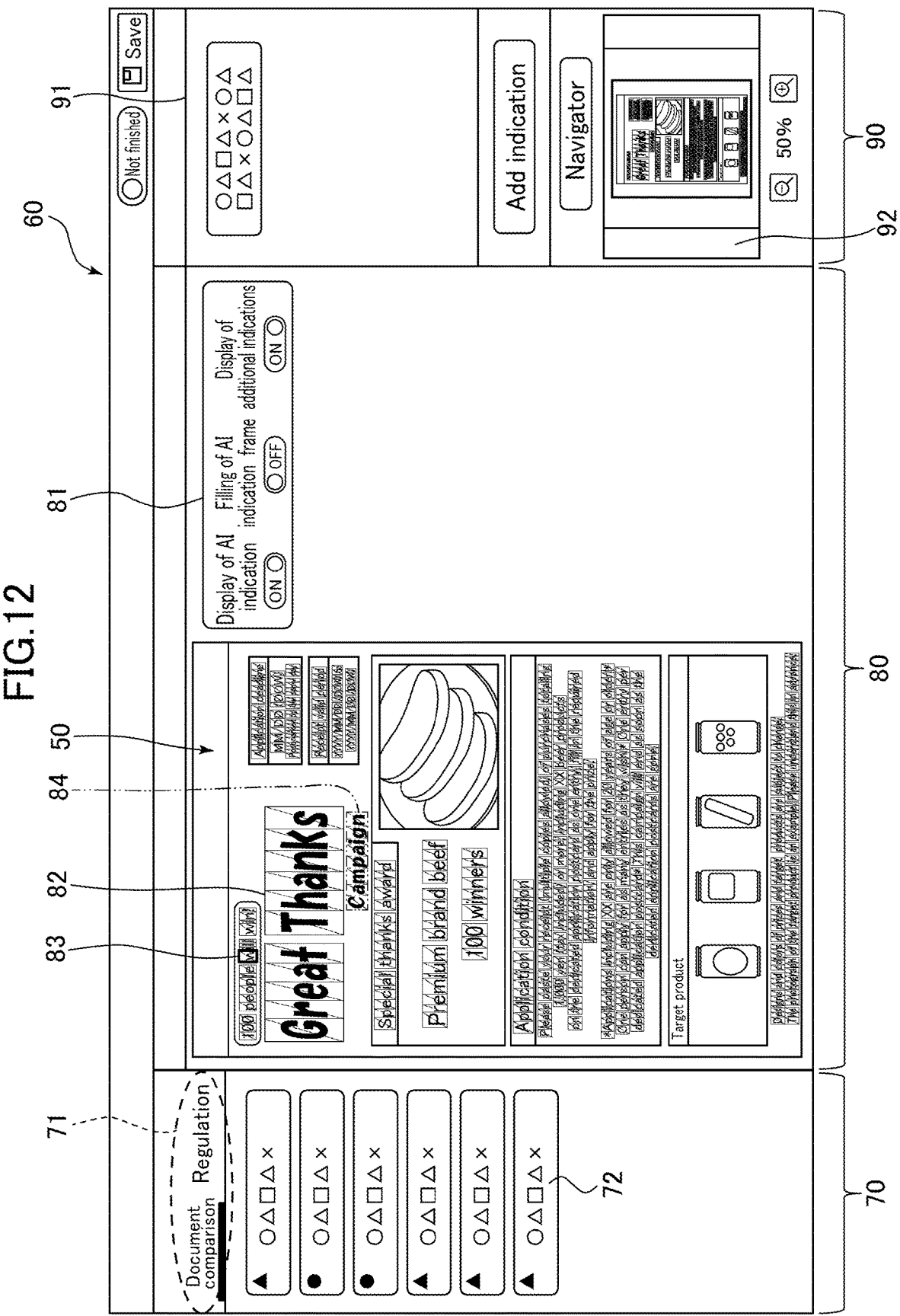
FIG. 12 is a diagram illustrating an example of a confirmation screen displayed on a display device by the display control unit.

FIG. 12 is a diagram illustrating an example of the confirmation screen 60 displayed by the display control unit 25. The confirmation screen 60 includes a determination result display region 70, a main screen region 80, and a sub-screen region 90. The display control unit 25 displays, in the main screen region 80, the image for printing 50 clearly indicating the region of the character determined, by the document determination unit 23, not to match the character string included in the document data, or the region of the character string determined, by the regulation determination unit 24, not to satisfy the predetermined condition defined by the regulation data. The display control unit 25 may display, in addition to or instead of the above demonstration, the image for printing 50 clearly indicating the element region 51 including the character determined, by the document determination unit 23, not to match the character string included in the document data, or the element region 51 including the character string determined, by the regulation determination unit 24, not to satisfy the predetermined condition defined by the regulation data. In an example, the main screen region 80 is located in a central portion of the confirmation screen 60.

The determination result display region 70 indicates a determination result determined by the document determination unit 23 or the regulation determination unit 24 for each of the element regions 51. The determination result display region 70 includes a confirmation object 72 associated with the element region 51 including the character determined, by the document determination unit 23, not to match the character string included in the document data, or the element region 51 including the character string determined, by the regulation determination unit 24, not to satisfy the predetermined condition defined by the regulation data. The determination result display region 70 includes a tab region 71 including a "Document comparison" tab for displaying the determination result by the document determination unit 23 and a "Regulation" tab for displaying the determination result by the regulation determination unit 24. The tab may be a button, a switch, or the like.

When the "Document comparison" tab is selected, the display control unit 25 displays, in the determination result display region 70, the confirmation object 72 associated with the element region 51 including the character determined, by the document determination unit 23, not to match the character string included in the document data. At this time, the display control unit 25 displays, in the main screen region 80, the image for printing 50 clearly indicating the region of the character determined, by the document determination unit 23, not to match the character string included in the document data. When the "Regulation" tab is selected, the display control unit 25 displays, in the determination result display region 70, the confirmation object 72 associated with the element region 51 including the character string determined, by the regulation determination unit 24, not to satisfy the predetermined condition defined by the regulation data. At this time, the display control unit 25 displays, in the main screen region 80, the image for printing 50 clearly indicating the region of the character string determined, by the regulation determination unit 24, not to satisfy the predetermined condition defined by the regulation data.

The display control unit 25 switches the tab selected in response to user input such as clicking with positioning a mouse pointer over a position where the "Document comparison" tab or the "Regulation" tab is displayed, and accordingly switches between displays of the determination result display region 70 and the main screen region 80.

FIG. 12 illustrates the confirmation screen 60 with the "Document comparison" tab being selected. The display control unit 25 displays, in the main screen region 80, the image for printing 50 in which rendered are a rendering object 82 indicating the region of the character determined by the document determination unit 23 to match the character string included in the document data, a rendering object 83 indicating the region of the character determined not to match the character string included in the document data, and a rendering object 84 indicating the region of the character determined by the document determination unit 23 to be incapable of comparison. The rendering objects 82, 83, and 84 are rendered for each character so that the determination result can be confirmed on a character-by-character basis. The rendering objects 82, 83, and 84 have colors, designs, or shapes different from each other so that they can be distinguished. For example, the rendering object 82 is an object covering a character region with a green frame, the rendering object 83 is an object covering a character region with a red frame, and the rendering object 84 is an object covering a character region with a purple frame. In an example, the display control unit 25 displays, in the main screen region 80, the image for printing 50 in which the rendering objects 82, 83, and 84 are superimposed.

In this example, the document determination unit 23, in a case of determining that the character string recognized by the image recognition unit 22 does not match the character string included in the document data, determines that the recognized character string is the character determined to be incapable of comparison if there is no element document data to be compared. However, since a character determined to be incapable of comparison can also be a character determined not to match a character included in the document data, the document determination unit 23 may not make the determination of incapable of comparison, and the display control unit 25 may display only the rendering objects 82 and 83.

The display control unit 25 displays a setting object 81 for changing a display setting in the main screen region 80. In an example, the setting object 81 includes a first switch for switching between before and after image processing according to the determination result for the image for printing 50, a second switch for switching image processing content, and a third switch for switching between display and non-display of the sub-screen region 90. The switches for switching may be buttons or the like.

For example, when "ON" of "Display of AI indication" of the first switch is selected in response to the user input on the confirmation screen 60 illustrated in FIG. 12, the display control unit 25 displays the image for printing 50 illustrated in FIG. 10 in the main screen region 80. For example, when "ON" of "Filling of AI indication frame" of the second switch is selected in response to the user input on the confirmation screen 60 illustrated in FIG. 12, the display control unit 25 displays, in the main screen region 80, the image for printing 50 in which insides of the frames of the rendering objects 82 to 84 are filled with colors or patterns corresponding to colors of the frames. For example, when "OFF" of "Display of additional indication" of the third switch is selected in response to the user input on the confirmation screen 60 illustrated in FIG. 12, the display control unit 25 displays the confirmation screen 60 not including the sub-screen region 90.

The sub-screen region 90 includes an additional item display region 91 indicating an additional indication item input by the user and a mini-screen 92 indicating a display location of the image for printing 50 in the main screen region 80.

Each of the confirmation objects 72 includes a check input object indicating whether the confirmation object 72 has been confirmed. For example, the check input object is a check box. Each of the confirmation objects 72 can also include a comment input object for receiving a comment in association with the confirmation object 72. For example, the comment input object is a comment input button. The information processing device 10 is configured to be able to receive a check input or a comment input for each of the confirmation objects 72.

Figure 13:
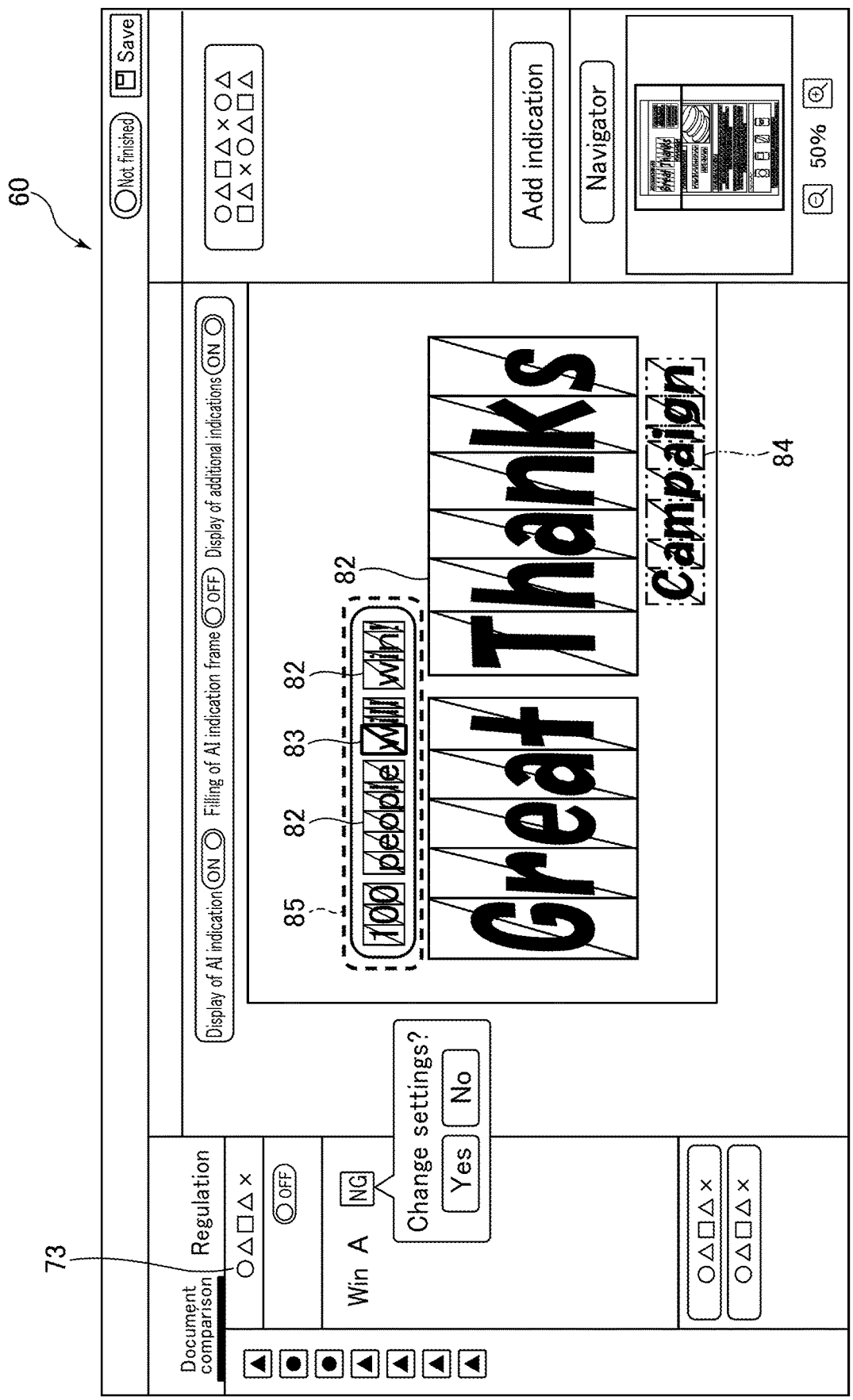
FIG. 13 is a diagram illustrating an example of the confirmation screen displayed on the display device by the display control unit.

FIG. 13 is a diagram illustrating an example of the confirmation screen 60 displayed by the display control unit 25 when one confirmation object 72 is selected on the confirmation screen 60 illustrated in FIG. 12. The display control unit 25 displays the confirmation field 73 corresponding to the selected confirmation object 72 and displays, in the main screen region 80, a screen focused on the element region 85 corresponding to the confirmation object 72. As illustrated in FIG. 13, the element region 85 includes the rendering object 83 indicating the region of the character determined not to match the character string included in the document data. Note that in FIG. 13, the element region 85 also includes the rendering object 82 indicating the region of the character determined to match the character string included in the document data. The display control unit 25 displays the character determined not to match the character string included in the document data in the confirmation field 73 and displays a message prompting the user to input whether the determination is good or bad. The display control unit 25 is configured to be able to receive the input indicating whether the determination is good or bad in response to user input. The display control unit 25 is also configured to be able to receive a comment input in association with the determination in response to user input.

Figure 14:
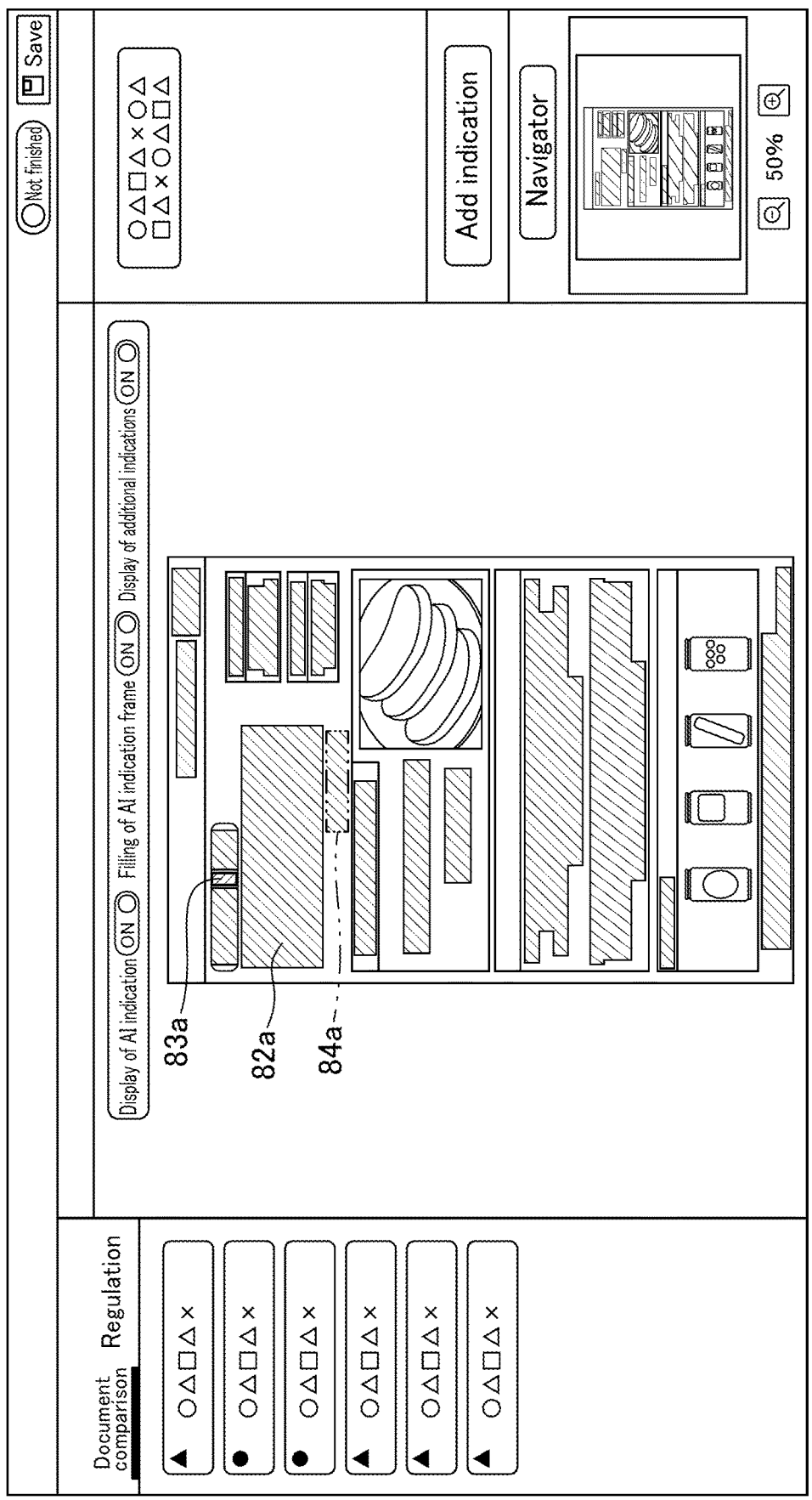
FIG. 14 is a diagram illustrating an example of the confirmation screen displayed on the display device by the display control unit.

FIG. 14 is a diagram illustrating the confirmation screen 60 displayed by the display control unit 25 when "ON" of "Filling of AI indication frame" of the second switch is selected in response to user input on the confirmation screen 60 illustrated in FIG. 12. The display control unit 25 displays, in the main screen region 80, the image for printing 50 in which rendered are rendering objects 82a, 83a, and 84a obtained by filling the inside of the frames of the rendering objects 82, 83, and 84 with the colors or patterns corresponding to the colors of the frames. In an example, the display control unit 25 displays, in the main screen region 80, the image for printing 50 in which the rendering objects 82a, 83a, and 84a are superimposed.

Figure 15:
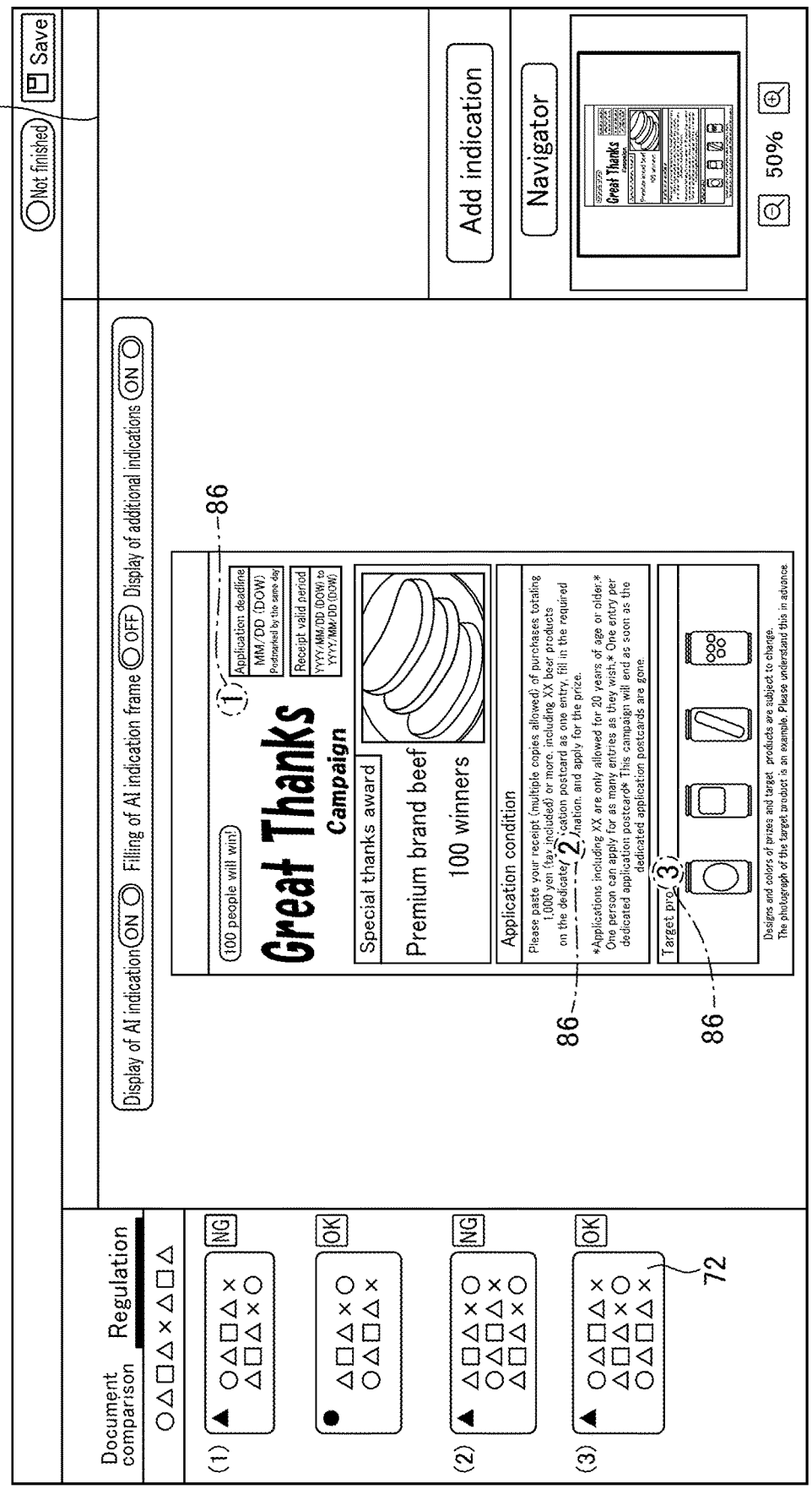
FIG. 15 is a diagram illustrating an example of the confirmation screen displayed on the display device by the display control unit.

FIG. 15 illustrates the confirmation screen 60 with the "Regulation" tab being selected. The display control unit 25 displays, in the main screen region 80, the image for printing 50 in which rendered is a rendering object 86 clearly indicating the region of the character string determined, by the regulation determination unit 24, not to satisfy the predetermined condition defined by the regulation data. In an example, the display control unit 25 displays, in the main screen region 80, the image for printing 50 in which the rendering object 86 is superimposed. The display control unit 25 displays, in the determination result display region 70, the confirmation object 72 associated with the element region 51 including the character string determined, by the regulation determination unit 24, not to satisfy the predetermined condition defined by the regulation data.

Figure 16:
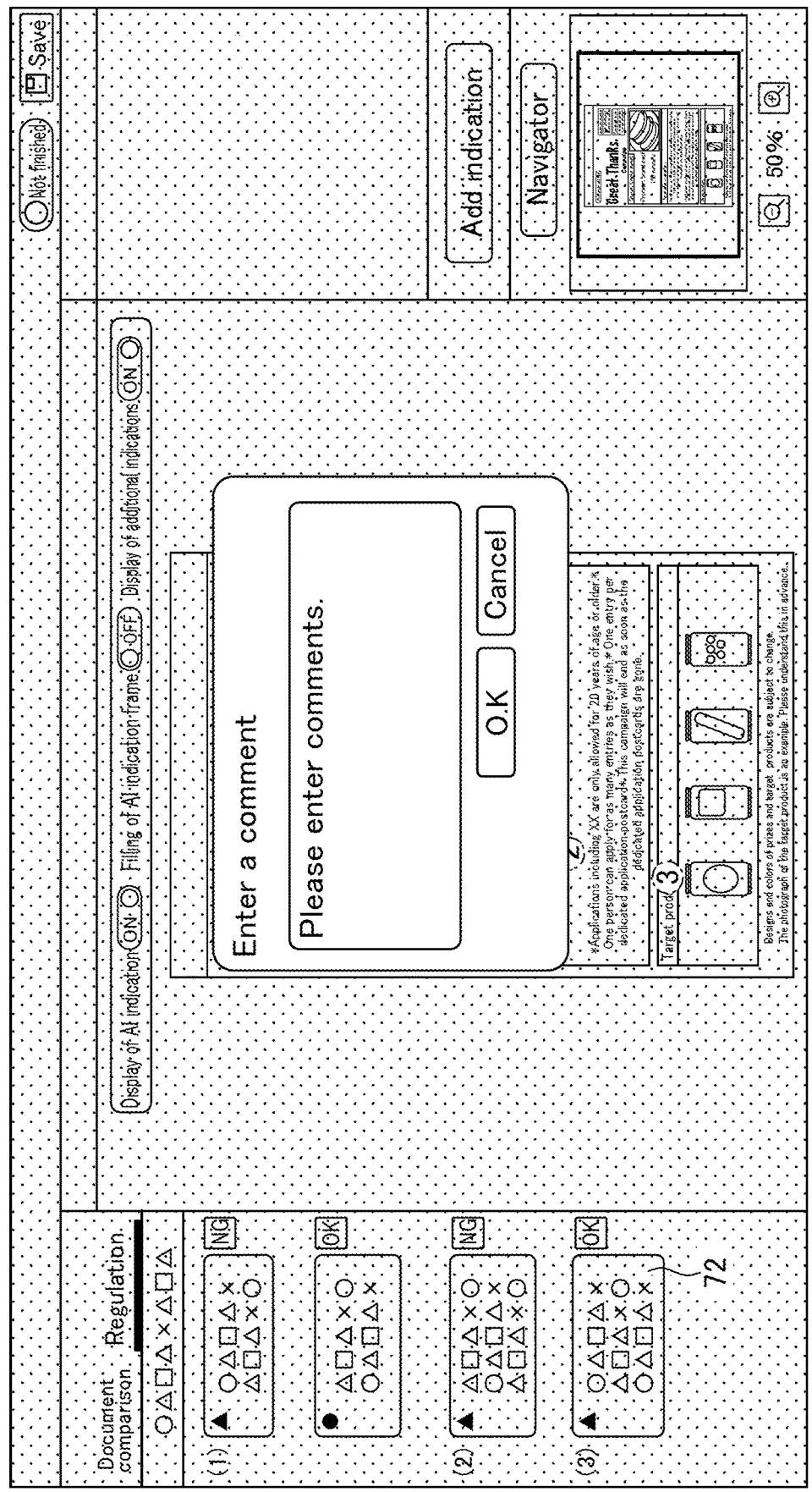
FIG. 16 is a diagram illustrating an example of the confirmation screen displayed on the display device by the display control unit.

FIG. 16 is a diagram illustrating an example of the confirmation screen 60 displayed by the display control unit 25 when the comment input button included in one confirmation object 72 is selected on the confirmation screen 60 illustrated in FIG. 15. The display control unit 25 displays a comment input screen for inputting a comment to be associated with the selected confirmation object 72.

Figure 17:
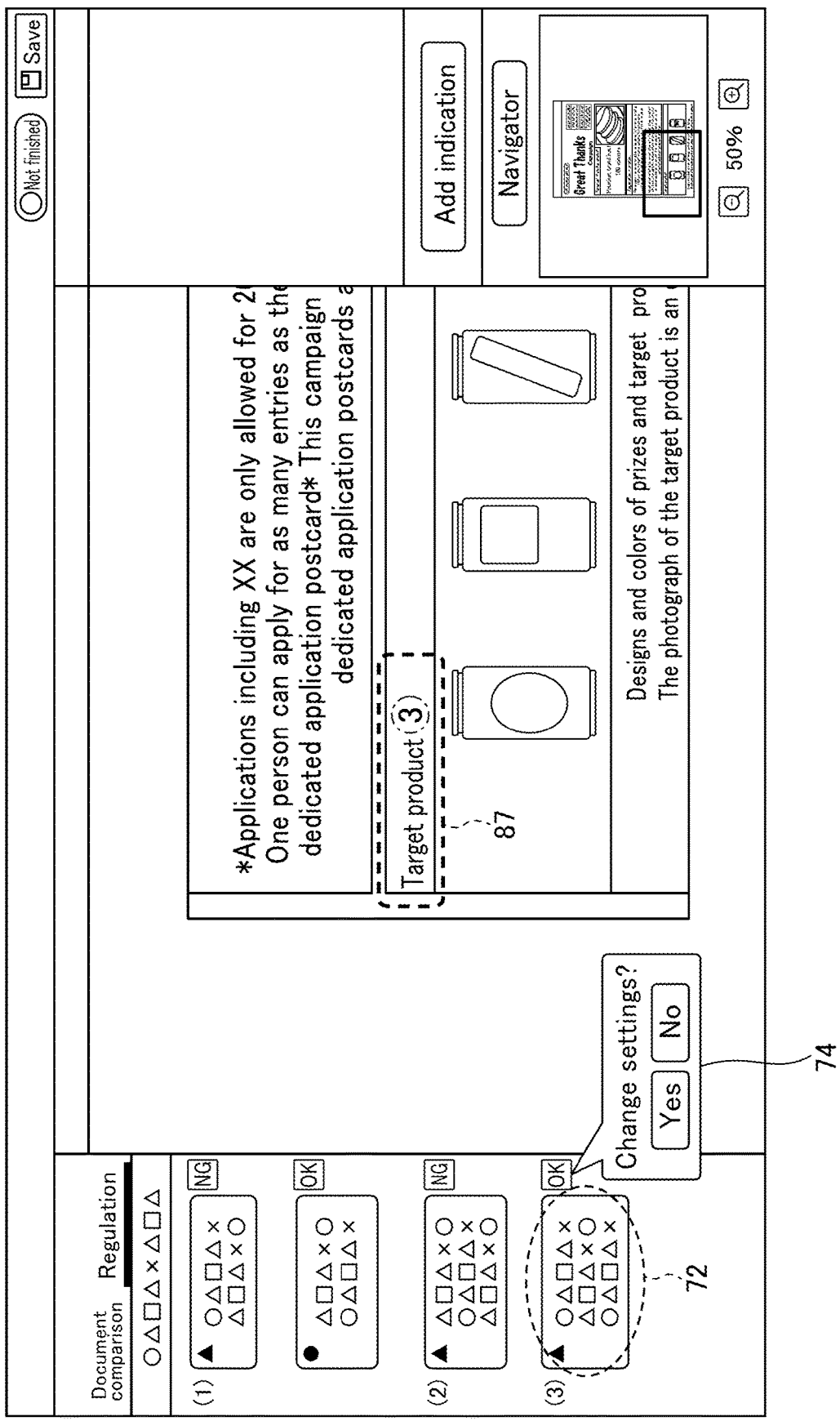
FIG. 17 is a diagram illustrating an example of the confirmation screen displayed on the display device by the display control unit.

FIG. 17 is a diagram illustrating an example of the confirmation screen 60 displayed by the display control unit 25 when one confirmation object 72 is selected on the confirmation screen 60 illustrated in FIG. 15. The display control unit 25 displays, in the determination result display region 70, a confirmation object 72 indicating the content determined not to satisfy the predetermined condition defined by the regulation data and displays a message object 74 (for example, a message box) prompting input about whether the determination is good or bad, in association with the confirmation object 72. At this time, the display control unit 25 displays, in the main screen region 80, a screen focused on the element region 87 corresponding to the confirmation object 72.

Figure 18:
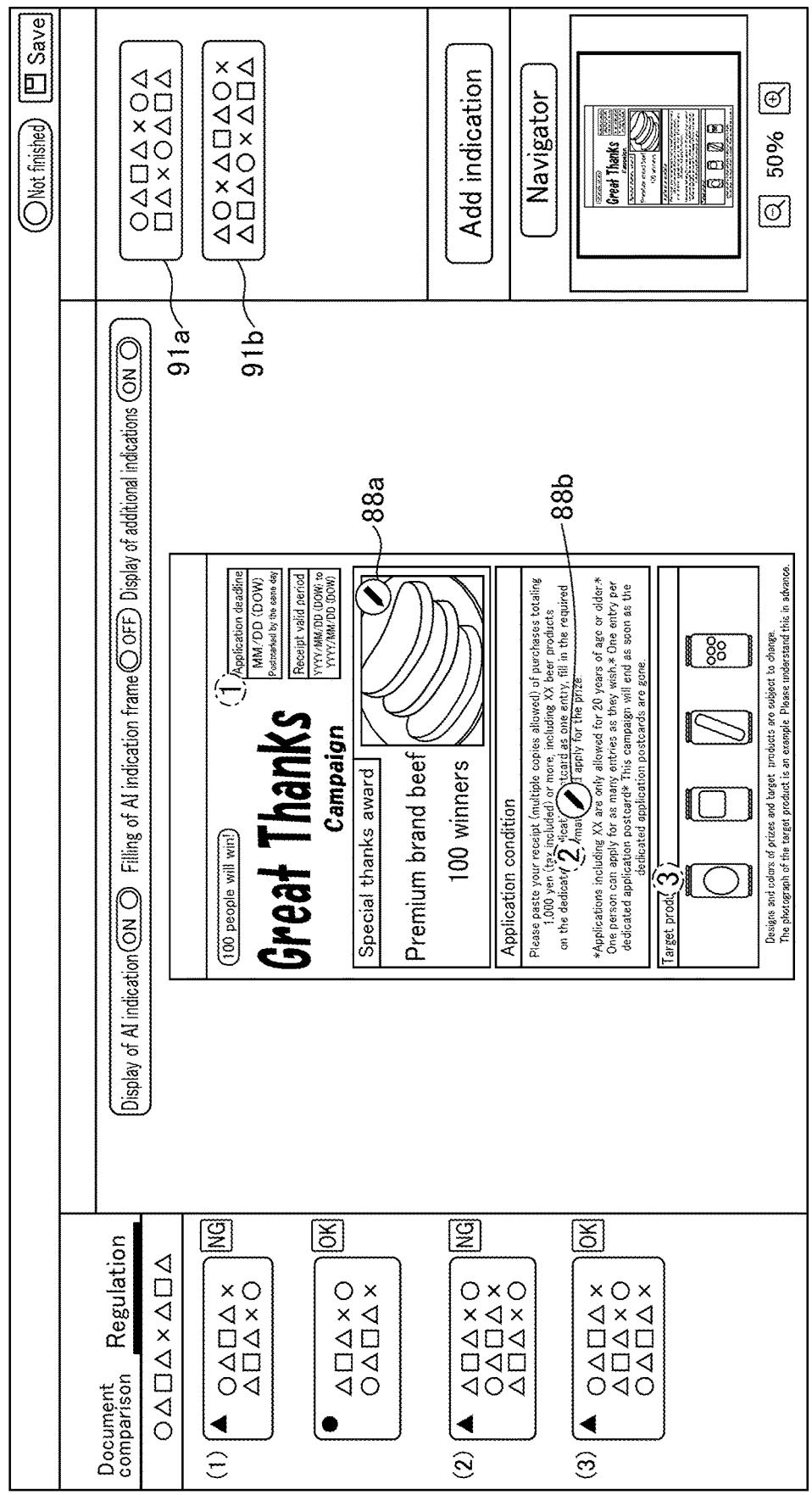
FIG. 18 is a diagram illustrating an example of the confirmation screen displayed on the display device by the display control unit.
Figure 19:
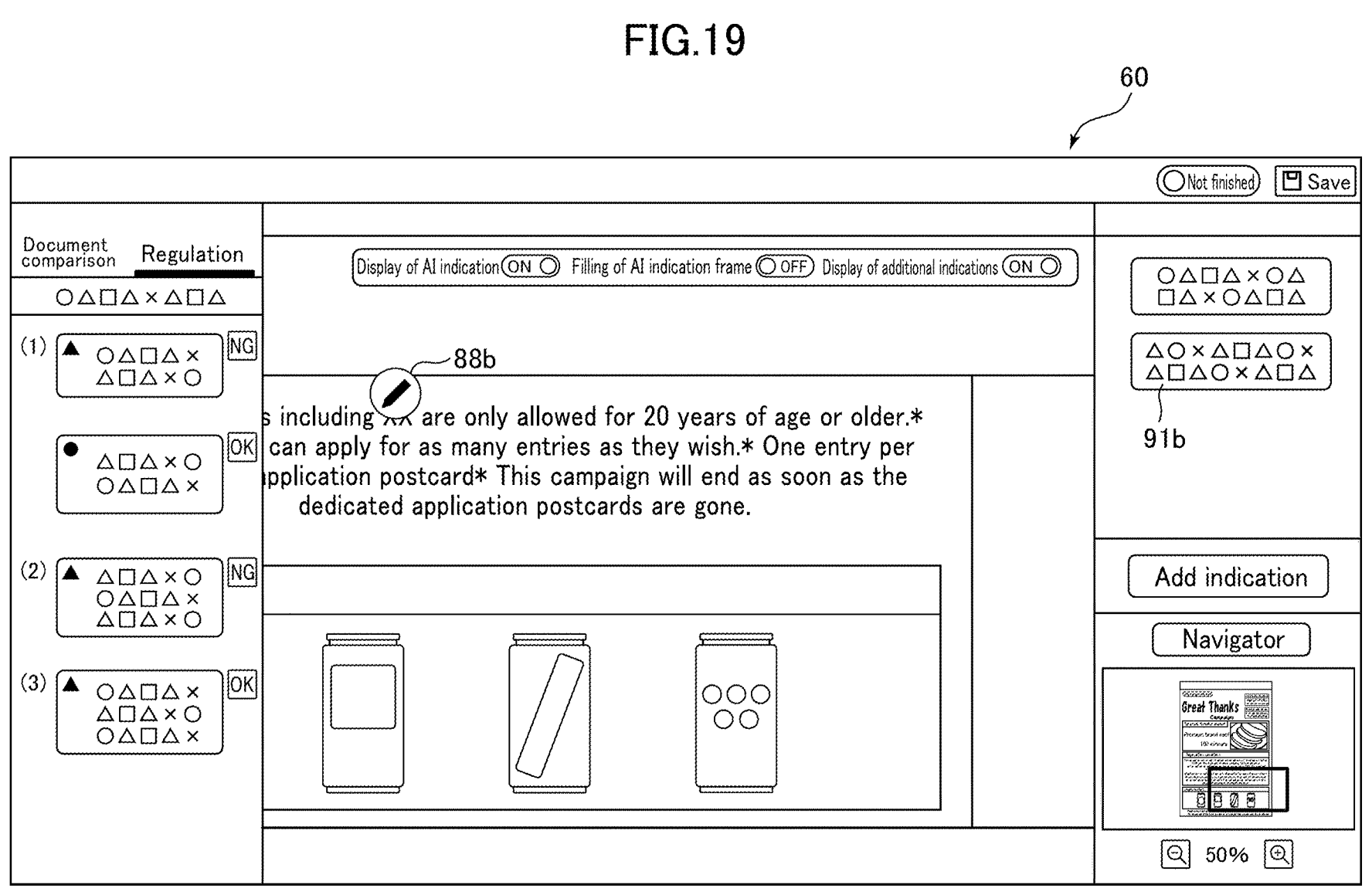

FIG. 18 is a diagram illustrating an example of the confirmation screen 60 displayed by the display control unit 25 when additional indication items 91a and 91b are input on the confirmation screen 60 illustrated in FIG. 15. The display control unit 25 displays, in the main screen region 80, the additional indication items 91a and 91b in the sub-screen region 90 and displays additional indication items 88a and 88b associated with the additional indication items 91a and 91b, respectively. FIG. 19 is a diagram illustrating an example of the confirmation screen 60 displayed by the display control unit 25 when one additional indication item 91b is selected on the confirmation screen 60 illustrated in FIG. 18. The display control unit 25 displays, in the main screen region 80, a screen focused on the additional item display object 88b associated with the additional indication item 91b.

Figure 20:
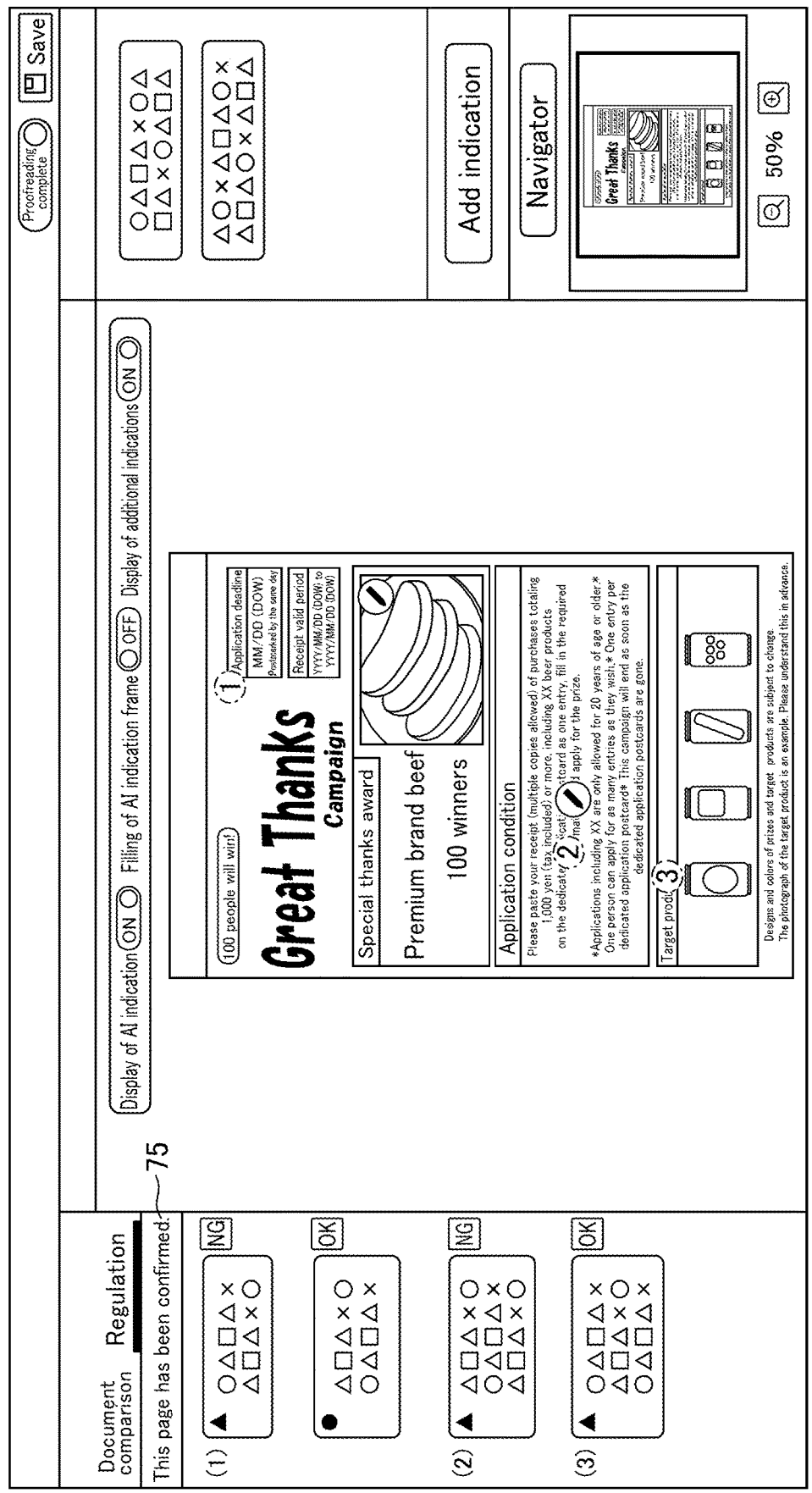
FIG. 20 is a diagram illustrating an example of the confirmation screen displayed on the display device by the display control unit.

FIG. 20 is a diagram illustrating an example of the confirmation screen 60 displayed by the display control unit 25 when the check input objects of all the confirmation objects 72 are checked through user input. For example, all the confirmation objects 72 are all the confirmation objects 72 displayed when the "Document comparison" tab and the "Regulation" tab are selected. The display control unit 25 displays, in the determination result display region 70, a message object (for example, a message box) 75 indicating that confirmation has been completed.

In this way, one user can examine the image for printing 50. The information processing device 10 is configured to store input contents of the checks and the comments of one user in the storage device 14 and to be able to receive check inputs and comment input similar to those of the one user from another user. In this case, the display control unit 25 is configured to be able to display the input contents of the one user at a position corresponding to the input place in the confirmation screen 60.

The confirmation screen 60 illustrated in FIGS. 12 to 20 is an example and is not limited to this configuration as long as similar functions can be implemented. For example, the main screen region 80 or the sub-screen region 90, instead of the determination result display region 70, may include the tab region 71.

Figure 21:
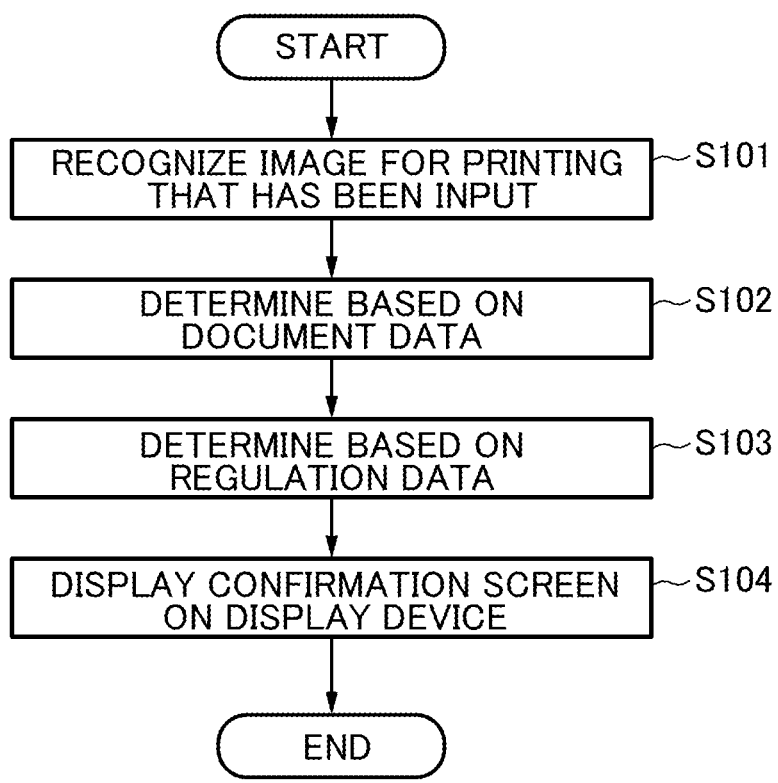
FIG. 21 is a flowchart for illustrating information processing executed in the information processing device according to an embodiment of the present invention.

FIG. 21 is a flowchart for illustrating information processing executed in the information processing device 10 according to an embodiment of the present invention. Here, it is assumed that the information processing device 10 receives an input of an image for printing to be examined and that the storage unit 21 stores the image for printing.

In step 101, the image recognition unit 22 recognizes a character string and a non-character object included in an image for printing that has been input and determines a plurality of element regions.

In step 102, the document determination unit 23 determines whether, in each of the element regions, an individual character of the character string recognized by the image recognition unit 22 matches an individual character of the character string included in the document data stored in the storage unit 21. In step 103, the regulation determination unit 24 determines whether, in each of the element regions, the character string recognized by the image recognition unit 22 satisfies a predetermined condition defined by the regulation data stored in the storage unit 21. Note that steps 102 and 103 may be performed simultaneously or in reverse order.

In step 104, the display control unit 25 displays, on the display device 33, the confirmation screen 60 including the image for printing clearly indicating the region of the character determined, by the document determination unit 23, not to match the character string included in the document data, or the region of the character string determined, by the regulation determination unit 24, not to satisfy the predetermined condition defined by the regulation data.

Next, operations and effects of the information processing device 10 (the information processing system 1) according to the embodiment of the present invention will be described.

In the related art, examination work such as proofreading or reviewing for the image for printing that is used for creating advertisements, product labels, packages, and the like has involved multiple people in multiple examinations such as the document comparative examination and the regulation examination, or a plurality of related departments according to the contents of examinations. The document comparative examination and the regulation examination are often performed separately. These circumstances made labor savings in the examination work of images for printing difficult.

In the present embodiment, the image recognition unit 22 determines a plurality of element regions in an image for printing that has been input and the document determination unit 23 and the regulation determination unit 24 perform the determination processing in each of the element regions based on the document data and the regulation data stored the storage unit 21. The display control unit 25 displays, in accordance with a user operation, the confirmation screen 60 including any one of an image for printing clearly indicating a region of a character determined, by the document determination unit 23, not to match a character string included in the document data, and an image for printing clearly indicating a region of a character string determined, by the regulation determination unit 24, not to satisfy a predetermined condition defined by the regulation data.

Such a configuration enables partial automation of two examinations of the document comparative examination and the regulation examination. This only requires the user to check a portion where the determination result output by the information processing device 10 is not good, enabling labor savings in the examination work of the image for printing. Multiple users can confirm the determination result output by the display control unit 25 via the user terminals 30, enabling labor savings in the examination work of the image for printing.

The present embodiment allows the display control unit 25 to be configured to render a rendering object for each character so that the determination result can be confirmed on a character-by-character basis for the region determined, by the document determination unit 23, not to match the character string included in the document data. Such a configuration enables a character for which the determination result by the document determination unit 23 is not good to be more clearly confirmed. This enables labor savings in the examination work of the image for printing.

In the present embodiment, the display control unit 25 displays, in the confirmation screen 60, the determination result display region 70 indicating the determination result by the document determination unit 23 or the regulation determination unit 24 for each of the element regions. The determination result display region 70 includes a confirmation object 72 associated with the element region including the character determined, by the document determination unit 23, not to match the character string included in the document data, or the element region including the character string determined, by the regulation determination unit 24, not to satisfy the predetermined condition defined by the regulation data. Each of the confirmation objects 72 includes a check input object indicating whether the confirmation object has been confirmed. At this time, the display control unit 25 can display, in the main screen region 80, a screen focused on the element region 85 corresponding to the selected confirmation object 72.

Such a configuration allows the user to confirm all the portions where the determination result output by the information processing device 10 is not good only by checking the confirmation object 72 on the confirmation screen 60, enabling labor savings in the examination work of the image for printing.

In the present embodiment, the display control unit 25 switches, in accordance with a user operation, between the image for printing clearly indicating the region of the character determined, by the document determination unit 23, not to match the character string included in the document data, and the image for printing clearly indicating the region of the character string determined, by the regulation determination unit 24, not to satisfy the predetermined condition defined by the regulation data and displays one of the images for printing in the confirmation screen 60.

Such a configuration enables the portions where the determination results of two examinations are not good to be separately grasped and confirmed on one screen. This enables labor savings in the examination work of the image for printing.

In the present embodiment, the document data includes a plurality of pieces of element document data, each of the plurality of pieces of element document data including a character string corresponding to content to be output. The document determination unit 23 determines whether, in each of the element regions, the character string recognized by the image recognition unit 22 matches the character string included in any one piece of element document data of the plurality of pieces of element document data. The display control unit 25 displays, in the confirmation screen 60, an image for printing in which the region of the character determined to be matched by the document determination unit 23 and the region of the character determined not to be matched by the document determination unit 23 are filled with different colors or patterns.

Such a configuration enables the portion where the determination result by the document determination unit 23 is not good to be more clearly confirmed. This enables labor savings in the examination work of the image for printing.

The above operations and effects are the same in other embodiments and other examples unless otherwise specified.

In the embodiment of the present invention, the information processing system 1 can be implemented by a server-client system using the information processing device 10 as a server and the user terminal 30 as a client but is limited to this configuration.

In another embodiment of the present invention, a program for implementing the functions of the embodiment of the present invention described above and the information processing illustrated in the flowcharts and a computer-readable storage medium storing the program can be provided. In still another embodiment, a method for implementing the functions of the embodiment of the present invention described above and the information processing illustrated in the flowcharts can be provided. In still another embodiment, a server that can supply a computer with a program for implementing the functions of the embodiment of the present invention described above and the information processing illustrated in the flowcharts can be provided. In still another embodiment, a virtual machine that implements the functions of the embodiment of the present invention described above and the information processing illustrated in the flowcharts can be provided.

In another embodiment of the present invention, the user terminal 30 may include at least some of the storage unit 21, the image recognition unit 22, the document determination unit 23, the regulation determination unit 24, and the display control unit 25 included in the information processing device 10. In this case, the information processing device 10 and/or the user terminal 30 includes the storage unit 21, the image recognition unit 22, the document determination unit 23, the regulation determination unit 24, and the display control unit 25. For example, the display control unit 25 included in the information processing device 10 generates data for displaying the confirmation screen 60 and transmits the data to the user terminal 30, and the display control unit 25 of the user terminal 30 displays the confirmation screen 60 on the display device 33.

In another embodiment of the present invention, the image for printing may be written data created by document creation software or data in a list format created by spreadsheet software or the like, in addition to the Web image or the like.

Hereinafter, example applications of the embodiments of the present invention will be described. For example, a company (company A) such as a food company can examine both a package and an advertisement using the information processing system 1 according to the embodiments of the present invention.

In a first example application, the information processing device 10 (information processing system 1) is used in a situation where a package image of a product is examined in a case where a preliminary check of document data is not performed. A person in charge of the company A transfers (for example, transmits by e-mail) document data for the package image in a predetermined format and the data relating to the design of the package image to a package image production company (company B). The company B creates a package image based on the document data received from the company A, and transfers the created package image data to the company A.

The person in charge of the company A transmits the document data for the package image in a predetermined format and the package image data received from the company B to the information processing device 10 via the user terminal 30*a*. The document determination unit 23 in the information processing device 10 determines whether, in each of the element regions, an individual character of the character string recognized by the image recognition unit 22 matches an individual character of the character string included in the document data stored in the storage unit 21. The regulation determination unit 24 in the information processing device 10 determines whether, in each of the element regions, the character string recognized by the image recognition unit 22 satisfies a predetermined condition defined by the regulation data stored in the storage unit 21. The display control unit 25 in the information processing device 10 displays, on the user terminal 30*a*, the confirmation screen 60 including the image for printing clearly indicating the region of the character determined, by the document determination unit 23, not to match the character string included in the document data, or the region of the character string determined, by the regulation determination unit 24, not to satisfy the predetermined condition defined by the regulation data.

A person P in charge of the company A reviews the confirmation screen 60, performs a check input or a comment input to the check input object of the confirmation object 72, and inputs an additional indication item as necessary to perform examination. The information processing device 10 stores the input data from the user terminals 30*a*.

A person Q in charge in another department of the company A accesses the information processing device 10 via a user terminal 30*b*, reviews the confirmation screen 60 on which the content input by the person P in charge is reflected, and performs examination in the same manner as the person P in charge. Furthermore, one or more persons in charge of other department(s) of the company A can also perform examination through the confirmation screen 60. A person R in charge of the company A acquires data of the confirmation screen 60 on which the contents input by all the persons in charge of the company A are reflected from the information processing device 10 via a user terminal 30*c*, transfers the acquired data to the company B to request modification. The company B modifies the package image based on the received data. According to such an examination flow, the package image can be examined and modified. The same applies to advertisements.

In a second example application, the information processing device 10 (information processing system 1) is used in a situation where a package image of a product is examined in a case where a preliminary check of document data is performed. A person in charge of the company A transmits the document data for the package image in a predetermined format to the information processing device 10 via the user terminal 30*a*. The regulation determination unit 24 in the information processing device 10 determines whether a character string included in the document data satisfies a predetermined condition defined by the regulation data. In this case, the information processing device 10 is configured to be able to output the document data clearly indicating a region of a character string determined, by the regulation determination unit 24, not to satisfy the predetermined condition defined by the regulation data. The user terminals 30*a* receives the document data from the information processing device 10. The person in charge or a superior of the company A confirms and modifies as necessary the document data, and transfers the document data to the company B. The company B creates a package image based on the document data received from the company A, and transfers the created package image data to the company A. Thereafter, in the same manner as in the first example application, the company A performs examination and requests modification from the company B. According to such an examination flow, the package image can be examined and modified. The same applies to advertisements.

Hereinafter, modifications of the embodiments of the present invention will be described. Hereinafter, differences from the embodiments of the present invention will be mainly described. The modifications described below can be appropriately combined and applied to any embodiment or modification of the present invention as long as no contradiction arises.

In a modification, the display control unit 25 displays, in the confirmation screen 60, the image for printing clearly indicating the region of the character determined, by the document determination unit 23, not to match the character string included in the document data, and the region of the character string determined, by the regulation determination unit 24, not to satisfy the predetermined condition defined by the regulation data. For example, in this case, the display control unit 25 displays the image for printing in the main screen region 80. The display control unit 25 may be configured to display the image for printing clearly indicating only any one of the regions in response to a user operation.

In a modification, a learned model is generated in advance by learning a plurality of images for printing together with arrangement information of a character string and a non-character object, and the image recognition unit 22 recognizes a plurality of element regions using the learned model and recognizes a character string in each of the element regions. For example, by changing the learning data, the definition of the element region determined by the image recognition unit 22 can be changed.

In the processing or operations described above, the processing or operations can be modified freely as long as there is no occurrence of contradiction in the processing or operations such as using data that is not yet supposed to be used in a corresponding step. In addition, each example described above is exemplified for describing the present invention, and the present invention is not limited to these examples. The present invention may be implemented in various forms without departing from the scope thereof.

The invention claimed is:

1. An information processing device for assisting in examination of an image for printing, the information processing device comprising:
a memory configured to store the image for printing received from a user terminal, document data including a character string from which the image for printing is generated and regulation data defining a predetermined condition for checking a character string included in the image for printing; and
a processor configured to:
recognize the character string included in the image for printing that has been input and stored, and determine a plurality of element regions each including the respective character string recognized;
determine whether, in each of the element regions, an individual character of the recognized character string matches an individual character of the character string included in the document data;
determine whether, in each of the element regions, the recognized character string satisfies the predetermined condition defined by the regulation data; and control displaying, on a display device, a confirmation screen including the image for printing indicating a region of the individual character determined to not match the character string included in the document data or a region of the character string determined to not satisfy the predetermined condition defined by the regulation data, wherein the processor is further configured to control, in response to a user input, switching between the images for printing indicating the region of the individual character determined to not match the character string included in the document data and the image for printing indicating the region of the character string determined to not satisfy the predetermined condition defined by the regulation data, and displaying one of the images for printing in the confirmation screen.

2. The information processing device according to claim 1, wherein:

the processor is further configured to control displaying, in the confirmation screen, a determination result display region indicating a determination result based on the document data or the regulation data for each of the element regions, the determination result display region includes confirmation objects associated with respective element regions including the individual character determined to not match the character string included in the document data or respective element regions including the character string determined to not satisfy the predetermined condition defined by the regulation data, and each of the confirmation objects includes a check input object indicating whether the confirmation object has been confirmed.

3. The information processing device according to claim 1, wherein the document data includes a plurality of pieces of element document data each including a character string corresponding to content to be output, the processor determines whether, in each of the element regions, the recognized character string matches the character string included in any one piece of element document data of the plurality of pieces of element document data, and the processor controls displaying, in the confirmation screen, the image for printing in which a region of a character determined to be matched and a region of a character determined, by the document to be not matched are filled with different colors or patterns.

4. The information processing device according to claim 1, wherein the predetermined condition defined by the regulation data includes at least one of:

the recognized character string not including a predetermined prohibited word, the recognized character string not including a predetermined typographical error, the recognized character string including a predetermined essential word, an image recognized by the processor including a specific image, or a specific character or the specific image recognized by the image processor being displayed in a predetermined format.

5. The information processing device according to claim 1, wherein the information processing device is a server, and
processor controls displaying the confirmation screen on a display device of a client terminal.

6. A method for assisting in examination of an image for printing executed by a computer, the method comprising:

storing the image for printing received from a user terminal, document data including a character string from which the image for printing is generated and regulation data defining a predetermined condition for checking a character string included in the image for printing;

recognizing a character string included in the image for printing that has been input and stored, and determining a plurality of element regions each including the respective character string recognized;

determining whether, in each of the element regions, an individual character of the recognized character string matches an individual character of a character string included in the document data;

determining whether, in each of the element regions, the recognized character string satisfies a predetermined condition defined by the regulation data; and controlling displaying, on a display device, a confirmation screen including the image for printing indicating a region of the individual character determined to not match the character string included in the document data or a region of the character string determined to not satisfy the predetermined condition defined by the regulation data, wherein the method further comprises controlling, in response to a user input, switching between the images for printing indicating the region of the individual character determined to not match the character string included in the document data and the image for printing indicating the region of the character string determined to not satisfy the predetermined condition defined by the regulation data, and displaying one of the images for printing in the confirmation screen.

7. A non-transitory computer readable medium storing a program, wherein executing of the program causes a computer to execute the method according to claim 6.

8. An information processing system including an information processing device and a user terminal for assisting in examination of an image for printing, the information processing system comprising:

a memory configured to store the image for printing received from the user terminal, document data including a character string from which the image for printing is generated and regulation data defining a predetermined condition for checking a character string included in the image for printing; and a processor configured to:

recognize the character string included in the image for printing that has been input and stored, and determine a plurality of element regions each including the respective character string recognized;

determine whether, in each of the element regions, an individual character of the recognized character string matches an individual character of the character string included in the document data;

determine whether, in each of the element regions, the recognized character string satisfies the predetermined condition defined by the regulation data; and control displaying, on a display device of a user terminal, a confirmation screen including the image for printing indicating a region of the individual character determined to not match the character string included in the document data or a region of the character string determined to not satisfy the predetermined condition defined by the regulation data, wherein the processor is further configured to control, in response to a user input, switching between the images for printing indicating the region of the individual character determined to not match the character string included in the document data and the image for printing indicating the region of the character string determined to not satisfy the predetermined condition defined by the regulation data, and displaying one of the images for printing in the confirmation screen.

\* \* \* \* \*